US010839853B2

(12) United States Patent
Iyer et al.

(10) Patent No.: US 10,839,853 B2
(45) Date of Patent: Nov. 17, 2020

(54) AUDIO ENCODING FOR FUNCTIONAL INTERACTIVITY

(71) Applicant: ADORI LABS, INC., Santa Clara, CA (US)

(72) Inventors: Viswanathan Iyer, Santa Clara, CA (US); Kartik Parija, Bangalore (IN)

(73) Assignee: ADORI LABS, INC., Santa Clara, CA (US)

( * ) Notice: Subject to any disclaimer, the term of this patent is extended or adjusted under 35 U.S.C. 154(b) by 0 days.

(21) Appl. No.: 16/167,564

(22) Filed: Oct. 23, 2018

(65) Prior Publication Data

US 2019/0122698 A1 Apr. 25, 2019

Related U.S. Application Data

(60) Provisional application No. 62/576,620, filed on Oct. 24, 2017.

(51) Int. Cl.

| | |
|---|---|
| ***G11B 20/12*** | (2006.01) |
| ***G11B 20/10*** | (2006.01) |
| ***G06F 3/0482*** | (2013.01) |
| ***G06F 16/61*** | (2019.01) |
| ***G06F 16/635*** | (2019.01) |
| ***G06F 16/638*** | (2019.01) |
| ***G06F 16/68*** | (2019.01) |

(Continued)

(52) U.S. Cl.

CPC ............ *G11B 20/12* (2013.01); *G06F 3/0482* (2013.01); *G06F 16/61* (2019.01); *G06F 16/635* (2019.01); *G06F 16/638* (2019.01); *G06F 16/686* (2019.01); *G11B 20/10527* (2013.01); *H04H 20/31* (2013.01); *H04H 60/33* (2013.01); *H04H 60/74* (2013.01); *H04N 21/4334* (2013.01); *H04N 21/4398* (2013.01); *H04N 21/8352* (2013.01); *G10L 19/0018* (2013.01); *G11B 2020/1265* (2013.01); *H04H 2201/37* (2013.01); *H04H 2201/40* (2013.01)

(58) Field of Classification Search

CPC ........ H04H 60/66; H04H 60/31; H04H 60/33; H04H 60/74; H04H 20/31; H04H 20/38; H04H 2201/37; H04H 2201/40; H04H 60/27; H04H 60/56; H04H 60/73; G06F 16/61; G06F 16/635; G06F 16/638; G06F 16/686; G06F 3/0482; G10L 19/0018; G11B 2020/1265; G11B 20/10527; G11B 20/12; H04M 1/72527; H04M 1/72558; H04N 21/8352; H04N 21/8358

USPC ........................ 455/179.1, 205, 2.01; 700/94

See application file for complete search history.

(56) References Cited

U.S. PATENT DOCUMENTS 8,787,822 B2 7/2014 Iyer et al.
9,197,945 B2 * 11/2015 D'Amico ......... H04N 21/44008

(Continued)

*Primary Examiner* — Duc Nguyen
*Assistant Examiner* — Alexander L Eljaiek
(74) *Attorney, Agent, or Firm* — Mattingly & Malur, PC

(57) ABSTRACT

Some examples include receiving audio content through a microphone of an electronic device and determining whether embedded data is included in the received audio content. The electronic device may decode the received audio content to extract the embedded data. In addition, the electronic device may perform at least one of: sending a communication to a computing device over a network based on the extracted embedded data, or presenting information on a display of the electronic device based on the extracted embedded data.

20 Claims, 21 Drawing Sheets

(51) Int. Cl.

| | |
|---|---|
| ***H04H 60/33*** | (2008.01) |
| ***H04H 20/31*** | (2008.01) |
| ***H04N 21/8352*** | (2011.01) |
| ***H04N 21/439*** | (2011.01) |
| ***H04N 21/433*** | (2011.01) |
| ***H04H 60/74*** | (2008.01) |
| *G10L 19/00* | (2013.01) |

(56) References Cited

U.S. PATENT DOCUMENTS

| | | | | |
|---|---|---|---|---|
| 9,292,894 | B2 * | 3/2016 | MacIntosh ............ | G06T 1/0021 |
| 9,484,964 | B2 | 11/2016 | Iyer et al. | |
| 9,882,664 | B2 | 1/2018 | Iyer et al. | |
| 2003/0128861 | A1 * | 7/2003 | Rhoads .............. | H04N 1/32352<br>382/100 |
| 2008/0204273 | A1 * | 8/2008 | Crystal .................. | H04H 60/58<br>340/870.3 |
| 2014/0073236 | A1 | 3/2014 | Iyer et al. | |
| 2014/0073277 | A1 * | 3/2014 | Iyer .......................... | H04B 1/06<br>455/205 |
| 2018/0159645 | A1 | 6/2018 | Iyer et al. | |

* cited by examiner

900

902 — 12x4 MATRIX

| UID$_0$ | UID$_3$ | UID$_6$ | UID$_9$ | UID$_{12}$ | UID$_{15}$ | CRC$_1$ | CRC$_4$ | CRC$_7$ | CRC$_{10}$ | CRC$_{13}$ |
|---|---|---|---|---|---|---|---|---|---|---|
| UID$_1$ | UID$_4$ | UID$_7$ | UID$_{10}$ | UID$_{13}$ | SID$_0$ | CRC$_2$ | CRC$_5$ | CRC$_8$ | CRC$_{11}$ | CRC$_{14}$ |
| UID$_2$ | UID$_5$ | UID$_8$ | UID$_{11}$ | UID$_{14}$ | SID$_1$ | CRC$_3$ | CRC$_6$ | CRC$_9$ | CRC$_{12}$ | CRC$_{15}$ |
| PARITY | PARITY | PARITY | PARITY | PARITY | PARITY | PARITY | PARITY | PARITY | PARITY | PARITY |

| UID$_0$ | UID$_3$ | UID$_6$ | UID$_9$ | UID$_{12}$ | UID$_{15}$ | SID$_2$ | CRC$_1$ | CRC$_4$ | CRC$_7$ | CRC$_{10}$ | CRC$_{13}$ |
|---|---|---|---|---|---|---|---|---|---|---|---|
| UID$_1$ | UID$_4$ | UID$_7$ | UID$_{10}$ | UID$_{13}$ | SID$_0$ | SID$_3$ | CRC$_2$ | CRC$_5$ | CRC$_8$ | CRC$_{11}$ | CRC$_{14}$ |
| UID$_2$ | UID$_5$ | UID$_8$ | UID$_{11}$ | UID$_{14}$ | SID$_1$ | CRC$_0$ | CRC$_3$ | CRC$_6$ | CRC$_9$ | CRC$_{12}$ | CRC$_{15}$ |
| PARITY | PARITY | PARITY | PARITY | PARITY | PARITY | PARITY | PARITY | PARITY | PARITY | PARITY | PARITY |

906, 908, 910, 912

904 — 11x4 MATRIX

| GCODE$_0$ | GCODE$_4$ | GCODE$_8$ | GCODE$_{12}$ | GCODE$_{16}$ | GCODE$_{20}$ | GCODE$_{24}$ | GCODE$_{28}$ | GCODE$_{32}$ | GCODE$_{36}$ | GCODE$_{40}$ |
|---|---|---|---|---|---|---|---|---|---|---|
| GCODE$_1$ | GCODE$_5$ | GCODE$_9$ | GCODE$_{13}$ | GCODE$_{17}$ | GCODE$_{21}$ | GCODE$_{25}$ | GCODE$_{29}$ | GCODE$_{33}$ | GCODE$_{37}$ | GCODE$_{41}$ |
| GCODE$_2$ | GCODE$_6$ | GCODE$_{10}$ | GCODE$_{14}$ | GCODE$_{18}$ | GCODE$_{22}$ | GCODE$_{26}$ | GCODE$_{30}$ | GCODE$_{34}$ | GCODE$_{38}$ | GCODE$_{42}$ |
| GCODE$_3$ | GCODE$_7$ | GCODE$_{11}$ | GCODE$_{15}$ | GCODE$_{19}$ | GCODE$_{23}$ | GCODE$_{27}$ | GCODE$_{31}$ | GCODE$_{35}$ | GCODE$_{39}$ | GCODE$_{43}$ |

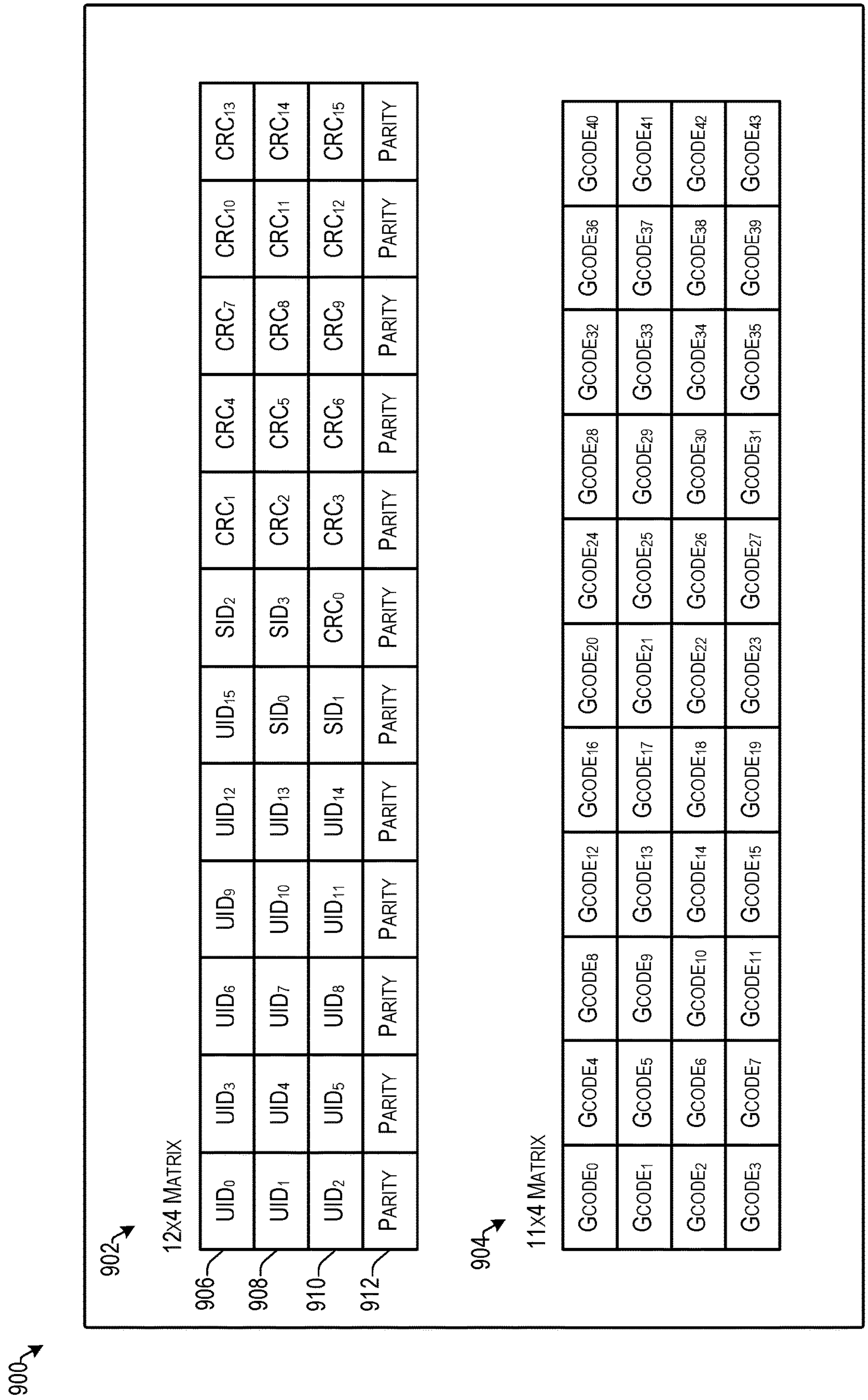

```
⋮
1202
ANALYTICS.LOGEVENT(
WITHNAME:"EPISODECLIPPEDSHARED",
PARAMETERS:[
  "ABSOLUTETIME",
  "OFFSETTIME",
  "EPISODEID",
  "USERID"
  ])
1204
ANALYTICS.LOGEVENT(
WITHNAME:"EPISODEBOOKMARKSHARED",
PARAMETERS:[
  "ABSOLUTETIME",
  "OFFSETTIME",
  "EPISODEID",
  "USERID"
  ])
1206
ANALYTICS.LOGEVENT(
WITHNAME:"TAGINTERACTED",PARAMETERS:[
  "ABSOLUTETIME",
  "OFFSETTIME",
  "EPISODEID",
  "USERID",
  "TAGID",
  "ACTION"
  ])
1208
ANALYTICS.LOGEVENT(
WITHNAME:"AUDIOSHARED",PARAMETERS:[
  "ABSOLUTETIME",
  "EPISODEID",
  "USERID"
  ])
⋮
```

| | COEFF | FREQ. | |
|---|---|---|---|
| BAND1 | 1 | 5.38 | |
| | 15 | 80.75 | |
| | 16 | 86.13 | |
| | 40 | 215.33 | |
| | 41 | 220.72 | |
| | 63 | 339.15 | |
| BAND2 | 64 | 344.53 | HALF BAND MARKER |
| | 79 | 425.28 | |
| | 80 | 430.66 | |
| | 101 | 543.71 | |
| BAND3 | 102 | 549.10 | |
| | 127 | 683.68 | |
| | 128 | 689.06 | HALF BAND MARKER |
| | 153 | 823.65 | |
| BAND4 | 154 | 829.03 | |
| | 182 | 979.76 | |
| | 183 | 985.14 | |
| | 216 | 1162.79 | |
| BAND5 | 217 | 1168.18 | |
| | 255 | 1372.74 | |
| BAND6 | 256 | 1378.13 | HALF BAND MARKER |
| | 295 | 1588.07 | |
| BAND7 | 296 | 1593.46 | |
| | 343 | 1846.47 | |
| BAND8 | 344 | 1851.86 | |
| | 399 | 2147.94 | |
| BAND9 | 400 | 2153.32 | |
| | 463 | 2492.42 | |
| BAND10 | 464 | 2497.85 | |
| | 511 | 2750.87 | |
| BAND11 | 512 | 2756.25 | HALF BAND MARKER |
| | 630 | 3391.48 | |
| BAND12 | 631 | 3396.86 | |
| | 740 | 3983.64 | |
| BAND13 | 741 | 3989.03 | |
| | 877 | 4721.15 | |
| BAND14 | 878 | 4726.54 | |
| | 1023 | 5507.12 | HALF BAND MARKER |
| BAND15 | 1024 | 5512.50 | |
| | 1280 | 6890.63 | |
| BAND16 | 1281 | 6896.01 | |
| | 1535 | 8263.37 | |
| | 1536 | 8268.75 | |
| | 2048 | 11025.00 | HALF BAND MARKER |

FIG. 18

AUDIO ENCODING FOR FUNCTIONAL INTERACTIVITY

CROSS-REFERENCES TO RELATED APPLICATIONS

This application claims the benefit of U.S. Provisional Application No. 62/576,620, filed Oct. 24, 2017, which is incorporated by reference herein in its entirety.

The following documents are incorporated by reference herein in their entirety: U.S. Pat. No. 9,882,664 to Iyer et al.; U.S. Pat. No. 9,484,964 to Iyer et al.; U.S. Pat. No. 8,787, 822 to Iyer et al.; U.S. Patent Application Pub. No. 2018/ 0159645 to Iyer et al.; and U.S. Patent Application Pub. No. 2014/0073236 to V. Iyer.

BACKGROUND

Consumers spend a significant amount of time listening to audio content, such as may be provided through a variety of sources, including broadcast radio stations, satellite radio, Internet radio stations, streamed audio, downloaded audio, Smart Speakers, MP3 players, CD players, audio included in video and other multimedia content, audio from websites, and so forth. Consumers also often desire the option to obtain additional information that may be associated with the subject of the audio, and/or various other types of promotions, offers, deals, entertainment, and so forth. Furthermore, content sources, such as artists, performers, distributors, broadcasters, and publishers often desire to know information about the audiences that their audio is reaching. However, this information can be difficult to determine in view of the many different possible delivery formats and options.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 9 illustrates example matrices that may be used during error checking according to some implementations.

FIG. 12 illustrates an example log data structure according to some implementations.

FIG. 18 illustrates a data structure showing the locations of half band markers according to some implementations.

DETAILED DESCRIPTION

Figure 1:
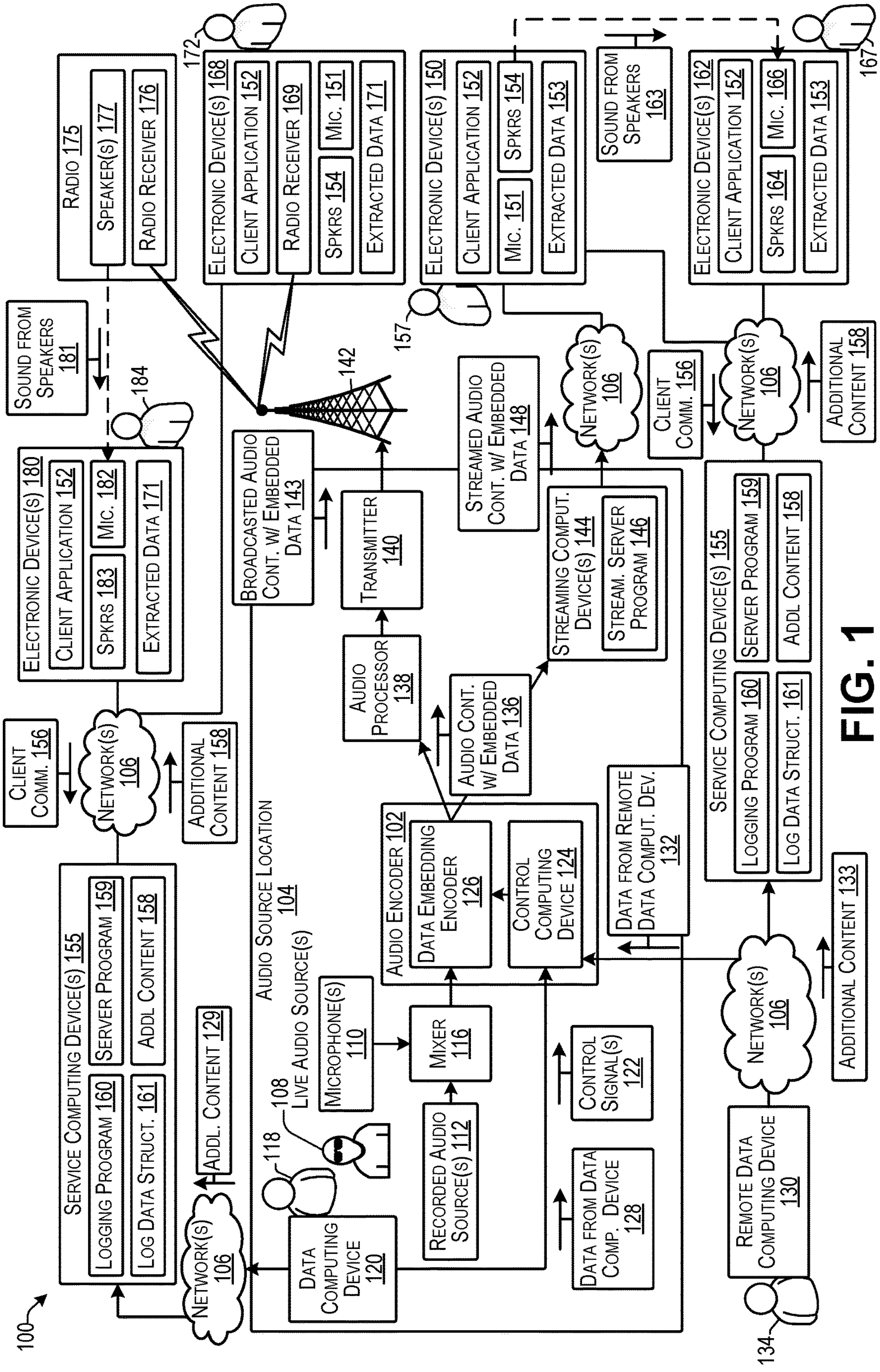
FIG. 1 illustrates an example system for embedding data in audio content and subsequently extracting the embedded data from the audio content according to some implementations.

Some examples herein include techniques and arrangements for embedding data into audio content at a first location, receiving the audio content at one or more second locations, and obtaining the embedded data from the audio content. In some cases, the embedded data may be extracted from the audio content or otherwise received by an application executing on an electronic device that receives the audio content. The embedded data may be embedded in the audio content for use in an analog audio signal, such as may be transmitted by a radio frequency carrier signal, and/or may be embedded in the audio content for use in a digital audio signal, such as may be transmitted across the Internet or other networks. In some cases, the embedded data may be extracted from sound waves corresponding to the audio content.

The data embedded within the audio signals may be embedded in real time as the audio content is being generated and/or may be embedded in the audio content in advance and stored as recorded audio content having embedded data. Examples of data that may be embedded in the audio signals can include identifying information, such as an individually distinguishable system identifier (ID) (referred to herein as a universal ID) that may be assigned to individual or distinct pieces of audio content, programs or the like. Additional examples of data that can be embedded include a timestamp, location information, and a source ID, such as a station ID, publisher ID, a distributor ID, or the like. In some examples, the embedded data may further include, or may include pointers to, web links, hyperlinks, Uniform Resource Locators (URLs), or other network location identifiers, as well as photographs or other images, text, bar codes, two-dimensional bar codes (e.g., matrix style bar codes, QR CODES®, etc.), multimedia content, and so forth.

As one example, suppose that a broadcast radio station, a podcast station, Internet radio station, other Internet streaming location, or the like, (collectively referred to as a "station" in some examples herein) is having a party with celebrity guest interviews, performances, and other live audio content that may be mixed with pre-recorded content, such as songs and commercials. The embedded data may include, may include a pointer to, or may otherwise be used to obtain an image of a celebrity taken at the party, and may further include, may include a pointer to, or may otherwise be used to obtain text, such as a telephone number for listeners to call, a URL for the listeners to access to view information about the celebrity, or the like. Additionally, or alternatively, the embedded data may enable the listeners to receive special offers, messages received by the station from listeners of the station (e.g., messages received by the station over TWITTER®, FACEBOOK®, or other social media), video clips, coupons, advertisements, additional audio content, and so forth. In addition, the embedded data may include identifying information that identifies the station and the time at which the audio content was broadcasted, streamed, or the like. This identifying information may be received by the listener electronic devices and provided to a logging computing device that includes software for determining the extent of the audience that received the broadcast or stream of a particular piece of audio content.

In some cases, the audio content in which the data is embedded may be a mix of both live audio and pre-recorded audio content. As one example, the audio content with the embedded data may be generated in real time, such as in the case of a radio jockey (RJ) speaking through a microphone while recorded music is also being played, or immediately before or after recorded music is played. For example, the RJ or other station personnel may determine data to embed in the audio content and may employ a computing device user interface to specify or otherwise select the data to be embedded in the audio and/or the content that is associated with the embedded data and provided to a service computing device that then serves the content to an electronic device that receives the embedded data in the audio content.

In some implementations, an audio encoder for embedding the data in audio content may be located at the audio source, such as at a radio broadcast station, a podcast station, an Internet radio station, other Internet streaming location, or the like. The audio encoder may include circuitry configured to embed the data in the audio content in real time at the audio source. The audio encoder may include the capability to embed data in digital audio content and/or analog audio content. In addition, previously embedded data may be detected at the audio source, erased or otherwise removed from the audio content, and new or otherwise different embedded data may be added to the audio content prior to transmitting the audio content to an audience.

Furthermore, at least some electronic devices of the audience members may execute respective instances of a client application that receives the embedded data and, based on information included in the embedded data, communicates over one or more networks with a service computing device that receives information from the client application regarding or otherwise associated with the information included in the embedded data. For example, the embedded data may be used to access a network location that enables the client application to provide information to the service computing device. The client application may provide information to the logging computing device to identify the audio content received by the electronic device, as well as other information, such as that mentioned above, e.g., broadcast station ID, podcast station ID, Internet streaming station ID, or other audio source ID, electronic device location, etc., as enumerated elsewhere herein. Accordingly, the audio content may enable attribution to particular broadcasters, streamers, or other publishers, distributers, or the like, of the audio content.

In some examples, the embedded data may include a call to action that is provided by or otherwise prompted by the embedded data. For instance, the embedded data may include pointers to information (e.g., 32 bits per pointer) to enable the client application to receive additional content from a service computing device, such as a remote web server or the like. Further, the embedded data may be repeated in the audio periodically until being replaced by different embedded data, such as for a different piece of audio content, e.g., different song, different program, different advertisement, or the like. The embedded data may also include a source ID that identifies the source of the audio content, which the service computing device can use to determine the correct data to serve based on a received pointer. For instance, the client application on each audience member's electronic device may be configured to send information to the service computing device over the Internet or other IP network, such as to identify the audio content or the audio source, identify the client application and/or the electronic device, identify a user account associated with the electronic device, and so forth. Furthermore, the client application can provide information regarding how the audio content is played back or otherwise accessed, e.g., analog, digital, cellphone, car radio, computer, or any of numerous other devices, and how much of the audio content is played or otherwise accessed.

In some examples, the audio source location is able to determine in real time a plurality of electronic devices that are tuned to or otherwise currently accessing the audio content. For example, when the electronic devices of the audience members receive the audio content, the client application on each electronic device may contact a service computing device, such as on a periodic basis as long as the respective electronic device continues to play or otherwise access the audio content. Thus, the station or other source of the audio content is able to determine in real time and at any point in time the reach and extent of the audience of the audio content. Furthermore, because the source of the audio content has information regarding each electronic device tuned to the audio content, the audio source is able to push additional content to the electronic devices over the Internet or other network. Furthermore, because the audio source manages both the timing at which the audio content is broadcasted or streamed, and the timing at which the additional content is pushed over the network, the reception of the additional content by the electronic devices may be timed for coinciding with playback of a certain portion of the audio content.

For the analog case, such as may be used in a broadcast radio scenario, the throughput of embedded data may be less than that for the digital (e.g., streaming) case. For example, for real time broadcasts, such as live shows, implementations herein may use a messaging system type of communication in which the broadcast station is equipped with a web-based content management system (CMS) software. Numerous Web CMS services are commercially available, such as WORDPRESS®, JOOMLA!®, DRUPAL®, TYPO3®, CONTAO®, and OPEN CMS, to name a few. In this example, when a listener tunes to the live show, such as through an FM radio, or the like, the client application herein executing on a mobile device, or other electronic device, or the like, may receive the sound waves through a microphone. The client application may decode the embedded data in the sound waves to detect information, such as a source ID, universal ID, or the like. After the client application determines the embedded information, such as a source ID, the client application may establishes a channel of communication between a computer associated with the identified source and the listener.

At this point, any additional content (sometimes referred to as "tags" herein) that is associated with the audio signal in the CMS may be determined by the client application, downloaded, and presented on the screen of the listener's device almost immediately. In some examples, the additional content may be represented by JSON (JavaScript Object Notation) code or other suitable programming language. The client application, in response to receiving the JSON code can render an embedded image, open an embedded URL or other http link, such as when a user clicks on it, or in the case of a phone tag, may display the phone number and enable a phone call to be performed when the user clicks on or otherwise selects the phone number.

Furthermore, in the digital case (e.g., streaming, download, etc.), there are additional challenges and some advantages too. The challenges in the digital case, such as when streaming a broadcast, include that no two streaming devices can be guaranteed to be streaming the same content at the same time. For instance, even if two devices are receiving the same content from the same source in the same room, there may be delays due to different networks, different network protocols, different decoder buffering, and the like. However, an advantage in the digital case is that there may be more room for embedding data in the audio content. For example, in the digital case, a timestamp such as a UNIX 32 bit Epoch time, may be embedded in the audio content to indicate a time at which the data was embedded in the audio content. As one example, when a tag or other specified additional content is associated with particular audio content at the station, the timestamp may be sent to the service computing device to be associated with the specified additional content. The client application on the listener's device may determine the source ID and, in some cases, location information. The client application may receive a notification from the service computing device when the additional content has been received by the service computing device, along with the associated time stamp. Accordingly, the client application may schedule receipt of the additional content associated with the timestamp. Thus, when the decoded timestamp matches the timestamp for the specified additional content, the specified additional content may be presented in coordination with the playing of the audio content.

Further, in some cases, the additional content may include a call to action that may be performed by the listener, such as clicking on a link, calling a phone number, sending a communication, or the like. As one example, an RJ may announce, "please call the number on your screen to win $100", and may send the telephone number to the service computing device, which in turn sends the telephone number to the electronic devices listed as being currently tuned to, streaming, or otherwise accessing, the audio content. Accordingly, the telephone number may be received by the electronic devices from the service computing device and (in the digital case) based on the embedded timestamp, may be timed to be presented concurrently with the announcement when the announcement is played by the electronic devices, such as by radio reception, on-demand streaming, or other techniques described herein. In some cases, the RJ or other user associated with the audio source may employ a computing device with a user interface that enables the user to specify data to be presented at certain times during the audio content program. Thus, numerous other types of additional content may be dynamically provided to the electronic devices while the audience members are accessing the audio content, such as poll questions, images, videos, social network posts, additional information related to the audio content, a URL, etc.

In addition, after the additional content is communicated to the connected electronic devices of the audience members, the service computing device may receive feedback from the electronic devices, either from the client application or from user interaction with the application, as well as statistics on audience response, etc. For example, the data analytics processes herein may include collection, analysis, and presentation/application of results, which may include feedback, statistics, recommendations and/or other applications of the analysis results. In particular, the data may be received from a large number of client devices along with other information about the audience. For instance, the audience members who use the client application may opt in to providing information such as geographic region in which they are located when listening to the audio content, anonymous demographic information associated with each audience member.

The received data may be analyzed to determine a source of the audio content, demographics of the audience for the audio content, the geographic region(s) in which the audience is located, and so forth. In some cases, the analyzed data may be packaged for presentation, such as for providing feedback to the RJ, statistics on the audience, recommendations based on the analysis, and the like. As one example, the feedback and statistics may be provided to the RJ or other user at the audio source in real time. In addition, the audio content program may be recorded so that when the program is played back at a later time the additional content or alternative content may be received from the service computing device at the later time. For example, in the case of the live contest for $100 mentioned above, instead of sending the telephone number to the electronic device, the service computing device may be configured to send an alternative text message indicating that the contest has ended.

Furthermore, in some implementations, the embedded data may be embedded in audio content associated with video. For example, the audio content from a piece of multimedia video can be processed to have embedded data in the same manner as the stand-alone audio content herein, and similar functionality may be obtained. Further, the examples herein are able to embed data into audio content without affecting the fidelity of the audio content. Thus, the disclosed technology enables audio content to be both bidirectional and responsive, and enables users to interact with received audio content regardless of the source of the audio content. Further, in some cases, the audio content may include control signals that provide the ability for a listener to play, pause, rewind, record and fast-forward the audio content, and may also offer bookmark, save, like, and share features to the listeners.

In addition, a logging program on the service computing device may maintain a log of programs to which a user has listened. Accordingly, the user may be able to access the log to listen to, or continue listening to, a particular program or to request to listen to similar programs recorded in the past. In some cases, users may tag and bookmark audio content using the client applications on their devices, may save audio content to listen to later, or the like. Furthermore, audio sources of the audio content, such as radio broadcast stations, podcast stations, Internet radio stations, or the like, may be able to determine more accurately the behavior of their audiences, such as through automated analysis of access to the audio content.

For discussion purposes, some example implementations are described in the environment of embedding data in audio content and subsequently extracting the embedded data. However, implementations herein are not limited to the particular examples provided, and may be extended to other content sources, systems, and configurations, other types of encoding and decoding devices, other types of embedded data, and so forth, as will be apparent to those of skill in the art in light of the disclosure herein.

FIG. 1 illustrates an example system 100 for embedding data in audio content and subsequently extracting data from the audio content according to some implementations. In this example, an audio encoder 102 may be located at or otherwise associated with an audio source location 104. Examples, of the audio source location 104 may include at least one of a broadcast radio station, a television station, a satellite radio station, an Internet radio station, a podcast station, a streaming media location, a digital download location, and so forth.

The audio encoder 102 may be an analog encoder, a digital encoder, or may include both an analog encoding circuit and a digital encoding circuit for embedding data in analog audio content and digital audio content, respectively. For example, the analog encoding circuit may be used to encode embedded data into analog audio content, such as may be modulated and broadcasted via radio carrier waves. Additionally, or alternatively, the digital encoding circuit may be used to encode embedded data into digital audio content that may be transmitted, streamed, downloaded, delivered on demand, or otherwise sent over one or more networks 106. Additional details of the audio encoder 102 are discussed below, e.g., with respect to FIGS. 5 and 6.

The one or more networks 106 may include any suitable network, including a wide area network, such as the Internet; a local area network, such an intranet; a wireless network, such as a cellular network, a local wireless network, such as Wi-Fi and/or close-range wireless communications, such as BLUETOOTH®; a wired network; or any other such network, or any combination thereof. Accordingly, the one or more networks 106 may include both wired and/or wireless communication technologies. Components used for such communications can depend at least in part upon the type of network, the environment selected, or both. Protocols for communicating over such networks are well known and will not be discussed herein in detail; however, in some cases, the communications over the one or more networks may include Internet Protocol (IP) communications.

In the illustrated example, the source location 104 may include one or more live audio sources 108, such as a person, musical instrument, sounds detected by one or more microphones 110, or the like. As one example, the live audio source 108 may include an RJ or other person speaking into the microphone(s) 110, a person singing into the microphone(s) 110, a person playing a musical instrument with the sound picked up by the microphone(s) 110, a musical instrument with a direct connection that does not require a microphone, and so forth.

In addition, the source location 104 may include one or more recorded audio sources 112, which may include songs or other audio content recordings, pre-recorded commercials, pre-recorded podcasts, pre-recorded programs, and the like. The live audio content from the live audio sources 108 (via microphone(s) 110 or otherwise), and the recorded audio content from the recorded audio sources 112 may be received by a mixer 116. For example, the mixer 116 may include any of a variety of board-style mixers, console-style mixers, or other types or mixers that are known in the art. The mixer 116 may control the timing of the recorded audio source(s) 112 and/or the live audio source(s) 108 to generate a flow of live and/or recorded audio content that may be ultimately broadcasted, streamed, downloaded, or otherwise distributed to a consumer audience.

Furthermore, in some examples, rather than pure audio content, the audio content may be extracted from multimedia such as recorded video or live video. Accordingly, in the case of recorded video, the recorded audio 112 may be extracted from the associated recorded video content and subjected to the data embedding herein. The audio content may then be recombined with the video content and broadcasted, streamed, downloaded, or otherwise distributed to an audience according to the implementations herein. Similarly, in the case of live video, the sound received by the microphone(s) 110 may be encoded with the embedded data according to the examples herein and may be subsequently combined with the live video thereafter for distribution to the audience.

The output of the mixer 116 is received by the audio encoder 102. In some examples, the audio encoder 102 may include a bypass circuit (not shown in FIG. 1) that may be remotely controlled by a user 118, such as studio personnel, the RJ, or the like. For example, the user 118 may use a user interface (not shown in FIG. 1) on a data computing device 120 to send one or more control signals 122 to a control computing device 124 of the audio encoder 102 for controlling the timing of the data embedding by a data embedding encoder 126 for encoding the audio content with embedded data in real time. As discussed below, the audio content may be directed to the data embedding encoder 126 for embedding data in the audio content or, alternatively, the audio content may be bypassed around the data embedding encoder 126 when it is not desired to include any embedded data in the audio content.

In addition, the user 118 may specify the data to be embedded in the audio content using the user interface presented on the data computing device 120. Accordingly, data 128 from the data computing device 120 at the source location 104 may be sent to the audio encoder 102, and may be received by the control computing device 124. The control computing device 124 may provide the data to be embedded to the data embedding encoder 126 to embed the data in the audio content at a desired location and/or timing in the audio content. In some examples, the embedded data may include one or more of a start-of-frame indicator, a universal ID assigned to each unique or otherwise individually distinguishable piece of audio content, a timestamp, location information, a station ID or other audio source ID, and an end-of-frame indicator. In addition, the embedded data may include content such as text and images.

Additionally, the embedded data may include one or more pointers to additional content stored at one or more network locations. For example, the data computing device may send additional content 129 over the one or more networks 106 to one or more service computing devices 155. For example, in the case of data content that is too large to include as a payload to be embedded in the audio content, the data content may be sent as additional content 129 to the service computing device(s) 155, and a pointer to the additional content 129 may be embedded in the audio content so that the additional content 129 may be retrieved by an electronic device following extraction of the embedded data from the audio content.

Additionally, or alternatively, a remote data computing device 130 may be able to communicate over the one or more networks with the control computing device 124 for providing data 132 from the remote data computing device 130. For example, a remote user 134 may use a user interface (not shown in FIG. 1) presented on the remote data computing device 130 for selecting and sending data 132 to be embedded into the audio content. Additionally, or alternatively, in some examples, one or more control signals (not shown in FIG. 1) may be sent from the remote data computing device 130 for controlling the audio encoder 102. In addition, the remote data computing device 130 may be used to also send additional content 133 to the service computing device(s) 155 that may be downloaded to the electronic devices of audience members based on a pointer included in the embedded data embedded in the audio content.

When the audio content is to be broadcasted by radio waves, such as in the case of an AM or FM radio transmission, the audio content with embedded data 136 output by the audio encoder 102 may be received by an audio processor 138 that processes the audio content for transmission by a transmitter 140. For example, as is known in the art, the audio processor 138 may normalize the volume of the audio content for complying with rules of the Federal Communications Commission (FCC), as well as preventing over modulation, limiting distortion, and the like. The processed audio content output by the audio processor 138 is provided to the transmitter 140, which modulates the audio content with a carrier wave at a specified frequency range and transmits the carrier wave via an antenna 142, or the like, as broadcasted audio content with embedded data 143.

Additionally, or alternatively, as another example, the audio content with embedded data 136 may be streamed over the one or more networks 106, such as on-demand or otherwise. In this case, the audio content with the embedded data 136 may be provided to one or more streaming computing device(s) 144. In some cases, the streaming computing device 144 may also perform any necessary audio processing. Alternatively, the streaming computing device 144 may receive processed audio content from the audio processor 138, rather than receiving the audio content with embedded data 136 directly from the audio encoder 102. In either event, the streaming computing device 144 may include a streaming server program 146 that may be executed by the streaming computing device 144 to send streamed audio content with embedded data 148 to one or more electronic devices 150 that may be in communication with the streaming computing device 144 via the one or more networks 106.

In implementations herein, a large variety of different types of electronic devices may receive the audio content distributed from the audio source location 104, such as via radio reception, via streaming, via download, via sound waves, or through any of other various reception techniques, as enumerated elsewhere herein, with several non-limiting examples being illustrated in FIG. 1. For example, the electronic device(s) 150 may be a smart phone, laptop, desktop, tablet computing device, connected speaker, voice-controlled assistant device, or the like, as additionally enumerated elsewhere herein, that may be connected to the one or more networks 106 through any of a variety of communication interfaces as discussed additionally below.

The electronic device 150 in this example executes an instance of a client application 152. The client application 152 may receive the streamed audio content with embedded data 148, and may decode or otherwise extract the embedded data from the streamed audio content with embedded data 148 as extracted data 153. In some examples, the client application 152 may include a streaming function for receiving the streamed audio content with embedded data 148 from the streaming server program 146. In other examples, a separate audio streaming application (not shown in FIG. 1) may be executed on the electronic device 150, and the client application 152 may receive the audio content from the streaming application. The electronic device 150 may further include a microphone 151 and speakers 154, as well as other components not illustrated in FIG. 1.

When the client application 152 on the electronic device 150 receives the audio content with embedded data 148, the client application 152 may extract the embedded data from the received audio content using the techniques discussed additionally below. Following extraction of the extracted data 153, the client application 152 may perform any of a number of functions, such as presenting information associated with the extracted data 153 on a display (not shown in FIG. 1) associated with the electronic device 150, contacting the service computing device(s) 155 over the one or more networks 106 based on information included in the extracted data 153, and the like. As one example, the extracted data 153 may include text data, image data, and/or additional audio data that may be presented by the client application 152 on the display associated with the electronic device 150 and/or the speakers 154, respectively.

As another example, the extracted data 153 may include timestamp information, information about the audio content and/or information about the audio source location 104 from which the audio content was received. In addition, the extracted data 153 may include a pointer, such as to a URL or other network address location for the client application 152 to communicate with via the one or more networks 106. For instance, the extracted data may include a URL or other network address of one or more service computing devices 155 as part of a pointer included in the embedded data. In response to receiving the network address, the client application 152 may send a client communication 156 to the service computing device(s) 155. For example, the client communication 156 may include the information about the audio content and/or the audio source location 104 from which the audio content was received, and may further include information about the electronic device 150, a user account, and/or a user 157 associated with the electronic device 150. For instance, the client communication 156 may indicate, or may enable the service computing device 155 to determine, a location of the electronic device 150, demographic information about the user 157, or various other types of information as discussed additionally below.

In response to receiving the client communication 156, the service computing device(s) may send additional content 158 to the electronic device 150. For example, the additional content 158 may include audio, images, multimedia, such as video clips, coupons, advertisements, or various other digital content that may be of interest to the user 157 associated with the respective electronic device 150. In some cases, the service computing device(s) 155 may include a server program 159 and a logging program 160. The server program 159 may be executed to send the additional content 158 to an electronic device 150 or the other electronic devices herein in response to receiving a client communication 156 from the client application on the respective electronic device 150, such as based on a pointer included in the extracted data 153.

In some examples herein, a pointer may include an ID that helps identify the audio content and corresponding tags for the audio content. For instance, a pointer may be included in the information embedded in the audio content itself instead of storing a larger data item, such as an image (e.g., in the case of a banner, photo, or html tag) a video, an audio clip, and so forth. The pointer enables the client application to retrieve the correct additional data at the correct context, i.e., at the correct timing in coordination with the audio content currently being received, played, etc. For example, the client application 152 (i.e., the decoder) may sends an extracted universal ID to the service computing device(s) 155 (e.g., using standard HTTP protocol). The service computing device(s) 155 identifies the audio content that is being received by the electronic device, and sends corresponding additional content 158, such as via JSON or other suitable techniques, such that the corresponding additional content 158 matches the contextual information for that particular audio content. Since the universal ID is received with the audio content, the audio content and its corresponding additional content 158 can be located without a search.

During a live transmission, the above-described technique may be performed a bit differently. As one example, a communication may be established between the client application 152 on an electronic device 150 and server program 159 on a service computing device 155. When the additional content 129 is added to the service computing device as additional content 158, the client application 152 may download the additional content 158 relevant to the audio content being received at the electronic device. As one example, the additional content 158 may be sent to the electronic device almost immediately, such as in a manner similar to broadcasting text messages to a group. The additional content 158 may include timing information is associated with a corresponding ID (e.g., the universal ID herein or the source ID). Thus, based on matching the timing information included in the additional content 158 and the timestamp included in the embedded data, the client application is able to present the additional content on the electronic device at the correct timing and in the correct context.

In addition, when the service computing device(s) 155 receives the client communication 156 from the client application 152, the logging program 160 may make an entry into a log data structure 161. For example, the entry may include information about the audio content that was received by the electronic device 150, information about the source location 104 from which the audio content was received, information about the respective electronic device 150, information about the respective client application 152 that sent the client communication 156, and/or information about the user 157 associated with the electronic device 150, as well as various other types of information. Accordingly, the logging program 160 as may generate the log data structure 161 that includes comprehensive information about the audience reached by a particular piece of audio content distributed from the source location 104. In some cases, the server program 159 may be executed on a first service-computing device 155 and the logging program 160 may be executed on a second, different service-computing device 155, and each service computing device 155 may receive a client communication 156. In other examples, the same service computing device 155 may include both the server program 159 and the logging program 160, as illustrated.

In addition, in some examples, real-time logs may be generated and sent to the data computing device 120, to the like, to inform the broadcaster, station personnel, or other source personnel of the number of listeners who are receiving the audio content, their location on a map, or other information of interest. Accordingly, the station personnel may use the received log information during the broadcast for various different applications.

Furthermore, on the client side, the client application 152 may maintain a buffer of all received additional content 158 so that a listener is able to go back and review the additional content 158 at a later point in time, if desired. Some examples herein may also include a notification feature, that enables the client application 152 to determine additional content 158 that may be received, but has not yet been received, such as in the case that the user has minimized the client application or let the client application go to a background mode.

Additionally, as another example, suppose that the electronic device 150 is used to play the received streamed audio content with embedded data 148 through the speakers 154. For example, suppose that one or more other electronic devices 162 are within sufficiently close proximity to the electronic device 150 to receive sound 163 from the speakers 154 associated with the electronic device 150. Thus, the electronic device 162 may include an instance of the client application 152 executing thereon, speakers 164, and a microphone 166. The sound 163 from the speakers 154 on the electronic device 150 may be received by the microphone 166 on the electronic device 162. Accordingly, the client application 152 executing on the electronic device 162 may also receive the audio content with embedded data 148 through the microphone 166 on the electronic device 162.

The client application 152 on the electronic device 162 may extract the embedded data from the received sound 163 received through the microphone 164 to obtain the extracted data 153. Accordingly, similar to the example discussed above, the client application 152 on the electronic device 162 may send a client communication 156 to the service computing device(s) 155. In response, the electronic device 162 may receive additional content 158 from the server program 159. In addition, the logging program 160 on the service computing device(s) 155 may make an additional entry to the log data structure 161 based on the received client communication 156 from the electronic device 162 that may include information about the electronic device 162, the client application 152 on the electronic device 162, and/or a user 167 associated with the electronic device 162. Further, the client application 152 may provide an indication as to how the audio content was received, e.g., through the microphone 166 in this case, rather than by other techniques, such as streaming, radio reception, podcast download, or the like.

As still another example, suppose that one or more electronic devices 168 each include an instance of the client application 152, a microphone 151, and speakers 154. Furthermore, this in this example, suppose that the electronic device(s) 168 includes a radio receiver 169. For example, many smartphones and other types of devices may include built-in radio receivers that may be activated and used for receiving radio transmissions, or the like. Accordingly, rather than receiving the audio content over the one or more networks 106, the electronic device 168 may receive broadcasted audio content with embedded data 143 through a radio transmission via the radio receiver 169 on the electronic device 168.

Upon receiving the broadcasted audio content with embedded data 143, the client application 152 may decode or otherwise extract the embedded data from the broadcasted audio content to obtain extracted data 171. In some examples, the extracted data 171 may be the same as the extracted data 153 extracted by the electronic devices 150 and 162. In other examples, the extracted data 171 may differ from the extracted data 153. For example, it may be possible to embed more data in digital audio sent over a network (e.g., streaming or downloaded) than in analog audio broadcasted as a radio signal using the data embedding techniques herein. Consequently, analog audio content transmitted via a radio signal may include less embedded data than digital audio content transmitted via the one or more networks 106.

Regardless of whether the extracted data 171 is the same as the extracted data 153, the client application 152 on the electronic device 168 may send a client communication 156 based on the extracted data 171 to the service computing device(s) 155. In response, the server program 159 may send the additional content 158 to the electronic device 168 and/or, the logging program 160 may add an entry to the log data structure 161 that may include information about the broadcasted audio content, the audio source location 104, the electronic device 168, the client application 152 executing on the electronic device 168, and/or a user 172 or user account associated with the electronic device 168.

As another example, the broadcasted audio content with embedded data 143 may be received by a radio 175, such as a car radio, portable radio, or other type of radio having a radio receiver 176 and speakers 177. The received audio content with embedded data 143 may be played by the radio 175 through the speakers 177. One or more electronic devices 180 may be within sufficiently close proximity to the radio 175 to receive sound 181 from the speakers 177. For example, the electronic device 180 may execute an instance of the client application 152, and may further include a microphone 182 and speakers 183. The sound 181 from the speakers 177 of the radio 175 may be received by the microphone 182 on the electronic device 180. Accordingly, the client application 152 executing on the electronic device 180 may also receive the broadcasted audio content with embedded data 143 through the microphone 182 on the electronic device 180.

The client application 152 on the electronic device 180 may extract the embedded data from the received sound 181 received through the microphone 182 to obtain the extracted data 171. In some examples, embedded data extracted from received sound 181 may be subject to additional error checking to correct any errors in the received data. As discussed additionally below with respect to FIGS. 8 and 9, various error correction techniques may be employed. As one non-limiting example, a Golay code error correction may be used in which an error correction code generates a polynomial function of the embedded data. Using this polynomial function, missing data is recovered by doing a curve fit or interpolation. Following the completion of error checking and/or correction, and similar to the examples discussed above, the client application 152 may determine one or more actions to perform based on the decoded data. For example, the client application 152 on the electronic device 180 may send a client communication 156 to the service computing device(s) 155. In response, the electronic device 180 may receive additional content 158 from the server program 159. In addition, the logging program 160 on the service computing device(s) 155 may make an additional entry to the log data structure 161 based on the received client communication 156 from the electronic device 180 that may include information about the electronic device 180, the client application 152 on the electronic device 180, and/or a user 184 or user account associated with the respective electronic device 180.

As mentioned above, there may be numerous different source locations 104, and a huge variety of audio content, such as, songs, audio programs, commercials, live broadcasts, podcasts, live streaming, on-demand streaming, and so forth, as enumerated elsewhere herein. Accordingly, by generating and analyzing the log data structure 161, the logging program 160 is able to determine information about the extent and the attributes of the audience that receives and listens to individual pieces of audio content. Further, the logging program 160 is able to correlate the audience with various different audio source locations, audio source entities, particular audio content, particular artists, and the like. As an example, several analytics that may be captured through the system 100 discussed above include identification of broadcast stations such as radio stations, podcast stations, Internet radio stations, or the like, a geographic distribution of the audience, and a measurement of audience engagement with the particular audio content such as how members of an audience receive the audio content, when members of the audience tune in and/or tune out of a radio broadcast, podcast, live streaming, etc., how much of an audio program or other audio content the audience actually listens to, timings at which communications are received from the user electronic devices, and timings at which the audience members interact with the extracted data 153 and/or the additional content 158 that may be provided through communication with the service computing device(s) 155, as discussed above.

FIGS. 2, 4, 7, 8, 10, 11, and 16 are flow diagrams illustrating example processes according to some implementations. The processes are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, architectures and systems described in the examples herein, although the processes may be implemented in a wide variety of other environments, architectures and systems.

Figure 2:
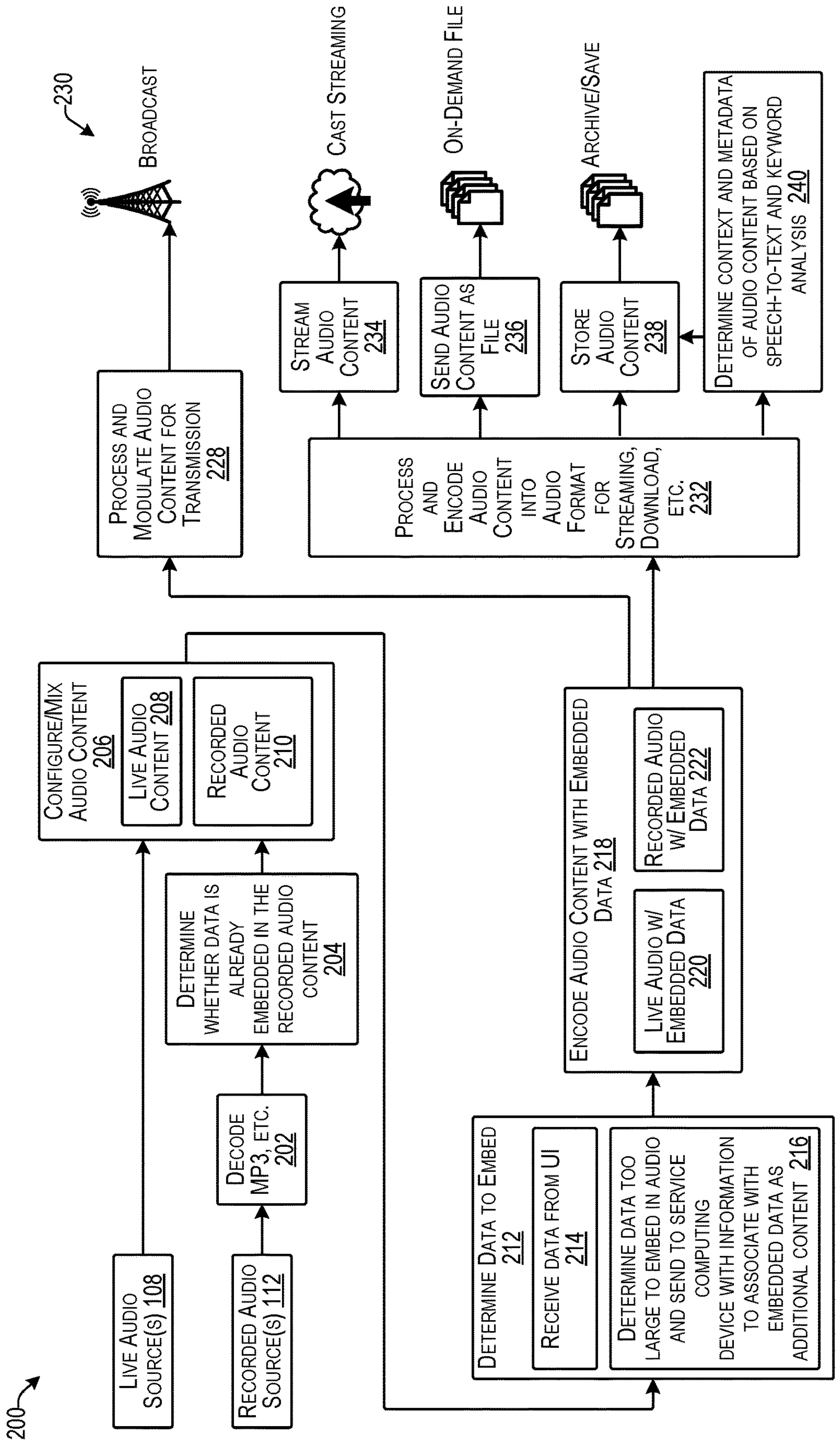
FIG. 2 illustrates an example logical configuration flow, such as based on the system discussed with respect to FIG. 1, according to some implementations.

FIG. 2 illustrates an example logical configuration flow 200, such as based on the system 100 discussed above with respect to FIG. 1 according to some implementations. In this example, the flow 200 includes the one or more live audio sources 108 and/or the one or more recorded audio sources 112, such as discussed above. In the case of a recorded audio source 112, the recorded audio source 112 may be decoded, as indicated at 202, such as in the case of MP3 or other type of recorded audio file format.

At 204, the system may determine whether data is already embedded in the recorded audio content 112. For example, a user may use the user interface on the data computing device discussed above to determine whether data is already embedded in the recorded audio, and, if desired, may remove the embedded data and replace the original embedded data with new embedded data to achieve a desired purpose. For instance, if the first embedded data indicates a different audio source ID or other identifying information, it may be desirable to change this embedded data to a current audio source ID, or the like, using the techniques discussed herein.

At 206, the audio content may be mixed or otherwise configured in a desired manner for distribution to an audience. For instance, in the case of a radio show, the audio content to be broadcasted, streamed, or otherwise distributed may alternate between live audio content 208 from the live audio sources 108 and the recorded audio content 210. Alternatively, such as in the case of an on-demand music service, there might be no live audio content 208, and the distribution of the recorded audio content 210 might be limited to streaming, digital download, or the like. As still another example, the live audio content 208 might be mixed as a voice-over of a portion of the recorded audio content 210. Numerous other variations will be apparent to those of skill in the art having the benefit of the disclosure herein.

At 212, the system may determine the data to embed in the audio content. As one example, the user may use a user interface presented by the data computing device (not shown in FIG. 2) to specify the data to be embedded into the audio content. Accordingly, the system may receive data from the data computing device UI, as indicated at 214. Further, the system may be configured to automatically embed particular data on a repeating basis. For example, the data may include the audio source ID, a timestamp, location, and a unique universal content ID, or the like.

Figure 3:
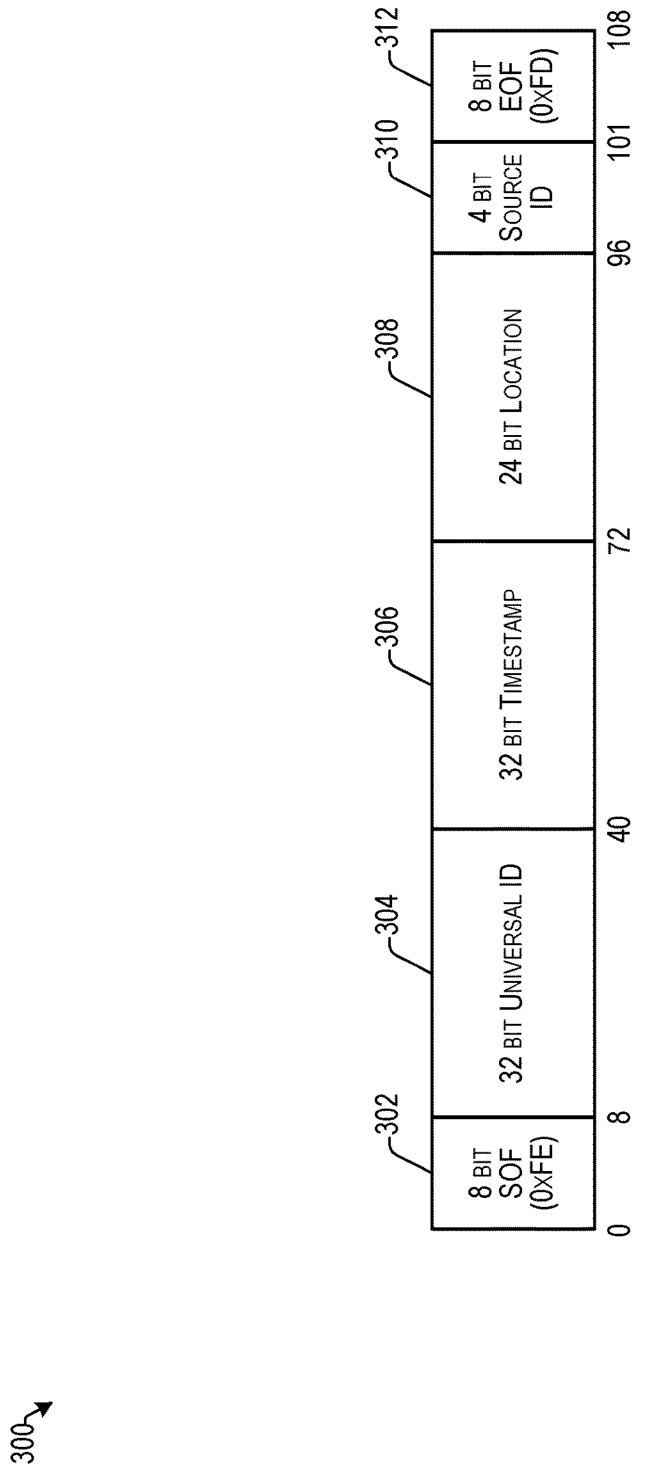
FIG. 3 illustrates an example of embedded data that may be embedded in audio content according to some implementations.

FIG. 3 illustrates an example of embedded data 300 that may be embedded in audio content according to some implementations. In this example, the embedded data 300 includes a start of frame (SOF) 302, which may be 8 bits in some cases. The embedded data 300 may further include a universal ID 304, which may be 32 bits in some cases, and which may provide a unique or otherwise individually distinguishable identifier for the particular audio content in which the data 300 is being embedded. The embedded data 300 may further include a timestamp 306, which may be a 32 bit timestamp in some cases, such as a UNIX epoch time or the like, and which may be used by the service computing device(s) discussed above for associating additional content received from the source with particular audio content.

The embedded data 300 may further include location information 308, which may indicate a geographic location of a source of the audio content. The embedded data 300 may further include a source ID 310, which may be an identifier assigned to the source of the audio content, and which may be used by the service computing device(s) discussed above for associating additional content received from the source with particular audio content. The embedded data 300 may further include an end of frame (EOF) 312, which may also be 8 bits in some cases. Furthermore, while one non-limiting example of a structure of embedded data is illustrated in this example, numerous other data configurations and content will be apparent to those of skill in the art having the benefit of the disclosure herein. For example, the data length between the SOF 302 and the EOF 312 may be increased substantially to allow a much larger number of bits than 92 to be included between the SOF 302 and the EOF 312 to enable various other data types to be embedded and transmitted in the audio signal.

Returning to FIG. 2, in some cases, as indicated at 216, the system or the user may determine that a selected piece of data is too large to embed as a payload in the audio content. For example, the amount of data that can be embedded in the audio content may be limited based on the amount of noise that may be caused by adding the embedded data to the audio content. Accordingly, data that requires more than a threshold number of bits to embed, e.g., 256 bits, 512 bits, 1024 bits, or so forth, might be deemed too large to embed. Accordingly, the data content is sent to the service computing device(s) as additional content 129, as discussed above with respect to FIG. 1, along with information to enable the service computing device to relate the additional content to a pointer or other information that is embedded in the audio content instead of the additional content.

At 218, the audio encoder may encode the audio content with embedded data. For example, using the techniques discussed below, the audio encoder may generate live audio with embedded data as indicated at 220 and/or may generate recorded audio with embedded data as indicated at 222. Furthermore, in the case that the recorded audio already has data embedded in it, as may have been determined at 210 discussed above, in some examples, the audio encoder may erase or otherwise remove the original embedded data and may replace the original embedded data with new embedded data as discussed additionally below, e.g., with respect to FIG. 7.

Figure 4:
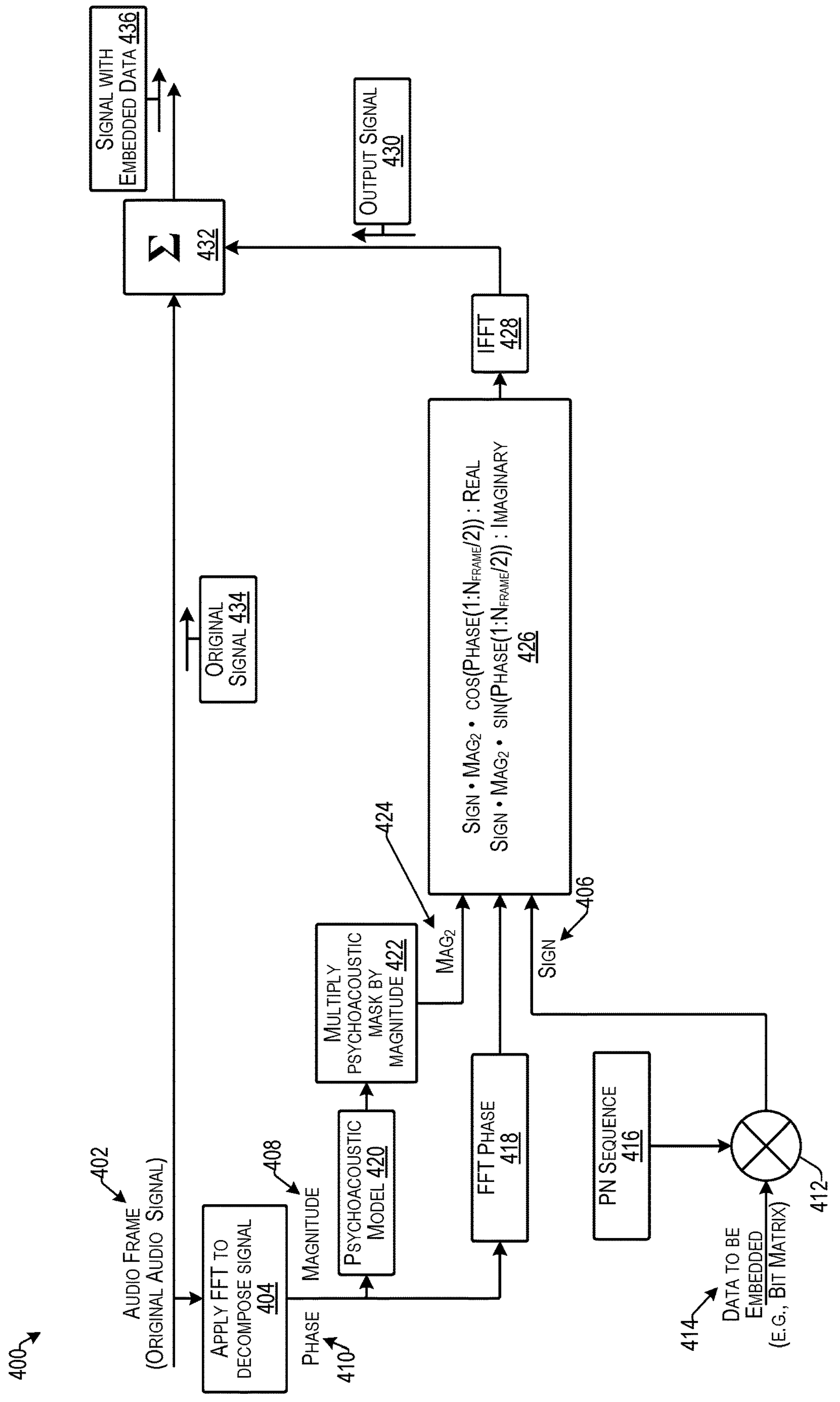
FIG. 4 illustrates an example process for embedding data into an audio signal while also making the embedded data inaudible for humans according to some implementations.

FIG. 4 illustrates an example process 400 for embedding data into an audio signal while also making the embedded data inaudible for humans according to some implementations. For example, the process 400 may be executed by an audio encoder such as under control of an encoding program executed on a computing device, e.g., as discussed additionally below with respect to FIGS. 5 and 6.

As indicated at 402, the encoder may receive an original audio signal (which may be an audio frame in the digital case) and may divide the signal into two signals, such as through use of a buffer or the like (not shown in FIG. 4).

At 404, the encoder may apply a fast Fourier transform (FFT) to decompose the audio signal to produce a complex function in the frequency domain. For instance, as is known in the art, a FFT is an algorithm that samples a signal over a period of time and divides the signal into a plurality of frequency components. For instance, the frequency components may be sinusoidal oscillations at distinct frequencies, and each of these may have an associated amplitude and phase. In this example, the complex function may be represented by a sine and cosine function, and may include the following components: sign 406, magnitude 408, and phase 410. In this example, the sign 406 is determined as described below at 412, while the magnitude 408 and phase 410 may be determined directly from the audio signal.

As indicated at 412, the sign 406 may be generated by spreading data 414 to be embedded (e.g., as a data bit matrix in this example) with a pseudo number (PN) sequence 416 (e.g., similar to a spread spectrum technique used in communication systems, such as in the CDMA communication protocol).

At 418, the phase 410 determined at 404 may be applied as determined.

At 420, a psychoacoustic model may be used to extract a psychoacoustic mask from the audio signal. In the examples herein, a psychoacoustic mask may be based on the human perception of sound. For instance, the human ear can hear frequencies from around 20 Hz to 20000 Hz. Even in the audible frequency range, the human ear does not perceive all the frequencies in the same way. If there are two tones of nearby frequencies being played simultaneously, the human ear may typically only perceive the stronger tone and may not be able to perceive the weaker tone. Thus, the effect where a tone is masked due to presence of other tones may be referred to as "auditory" or "psychoacoustic masking". The examples herein may employ an empirically determined masking model (e.g., ISO/IEC MPEG Psychoacoustic Model 1) to calculate the minimum masking threshold of an audio signal. The minimum masking threshold of the audio signal may be used to determine how much "noise" (e.g., corresponding to the embedded data in the implementations herein) can be mixed into the audio signal without being perceived by the typical human ear.

At 422, the psychoacoustic mask may be multiplied by the magnitude 408 to obtain a second magnitude ($Mag_2$) 424.

At 426, the complex function may be applied using the determined values for sign 406, phase 410 and second magnitude ($Mag_2$) 424. In this example, real values are represented by "$Sign*Mag_2*cos(Phase(signal))$" and imaginary values are represented as "$Sign*Mag_2*sin(Phase(signal))$". In this example, the signal is $N_{frame}/2$ where $N_{frame}$ is 512 signal points, and after taking FFT, the result is 256 bins in the frequency domain, hence there may be $N_{frame}/2$ data in the frequency domain (bins). Accordingly, the data may be inserted into the signal by extracting the psychoacoustic mask then multiplying the psychoacoustic mask with the magnitude component so that data is included in that portion of the signal that is determine to be inaudible to humans (e.g., based on the psychoacoustic mask determined using the psychoacoustic model 420.

At 428, by taking the inverse fast Fourier transform (IFFT) of the results of block 426, the original signal can be recovered in the time domain. In particular, through blocks 426 and 428, the second magnitude 424, sign 406, and phase 410 components are used to create an output signal 430 using the IFFT. The output signal 430 represents the psychoacoustic mask of the audio modulated with the data 414. The output signal 430 may have a relatively very small amplitude as compared with the original signal.

At 432, the output signal 430 is added to the original signal 434 to obtain the signal 436 with embedded data. Accordingly, the modulated signal is converted back to the time domain using the IFFT at 428 and is added to the original audio signal 434 to generate the signal 436 with embedded data in which the embedded data does not generate noise that is substantially audible to human hearing. The process for extracting the embedded data from the audio signal may be performed using the same psychoacoustic model that was used to embed the data in the audio signal.

Returning to FIG. 2, at 228, the system may process and modulate the encoded audio content for transmission and may broadcast the modulated audio content as indicated at 230.

At 232, the system may process and further encode the audio content into an audio format suitable for streaming, download, or the like.

At 234, the system may stream the audio content such as using cast streaming, live streaming, or other suitable streaming techniques.

At 236, the system may send the audio content as a file, such as an on-demand file, MP3 file, music download, podcast file, or the like.

At 238, the system may store the audio content such as by archiving or otherwise saving the audio content to a storage medium, such as a storage system, storage array, cloud storage, or the like.

At 240, the system may determine the context and metadata of the audio content based on speech-to-text and keyword analysis of the audio content. For example, the system may perform real time transcription of the audio content and the embedded data, and may determine context and metadata for the audio content automatically based on analysis of the transcript.

Figure 5:
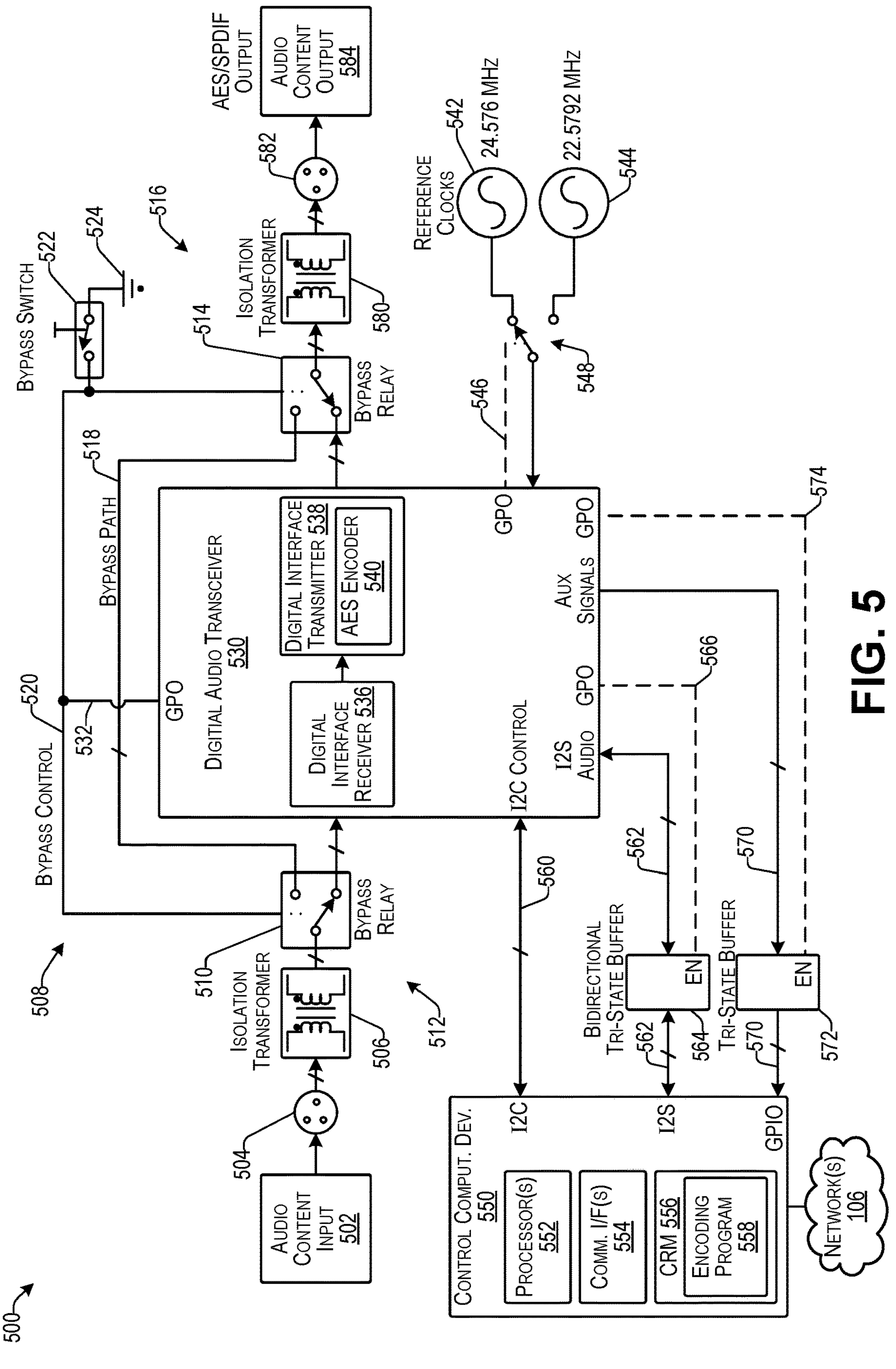
FIG. 5 illustrates an example circuit of a digital data encoder according to some implementations.

FIG. 5 illustrates an example circuit of a digital data encoder 500 according to some implementations. For instance, the digital data encoder 500 may be included in the audio encoder 102 discussed above with respect to FIG. 1, and may receive an audio content input 502, such as discussed above with respect to FIGS. 1 and 2. In the illustrated example, the digital encoder 500 may receive the audio content input 502 via an input connector, such as an XLR connector or other suitable connector. XLR is a professional audio connector standard that can carry digital and analog audio signals.

As one example the audio content input 502 may be in the Audio Engineering Society (AES) AES3 standard for the exchange of audio signals between audio devices and, in some cases, may be in the S/PDIF (Sony/Philips Digital Interface) variant of this standard, although implementations herein are not limited to any particular standard. For instance, S/PDIF can carry two channels of uncompressed PCM (pulse code modulation) audio or compressed 5.1/7.1 surround sound (such as DTS (dedicated to sound) audio codec).

The input audio signal is provided to an isolation transformer 506, which performs common mode noise rejection. For example, when the isolation transformer 506 is used as a single ended drive source, the isolation transformer 506 serves as a single ended input to balanced input converter. The isolation transformer 506 may also reject low frequency noise by providing a low frequency cut-off.

As mentioned above with respect to FIG. 1, the digital data encoder 500 may include a bypass circuit 508 including a first bypass relay 510 on an input side 512, and a second bypass relay 514 on an output side 516. The bypass circuit 508 may further include a bypass path 518 leading from the first bypass relay 510 to the second bypass relay 514. The bypass circuit 508 may further include a bypass control line 520 that connects to the first bypass relay 510 and the second bypass relay 514. A bypass switch 522 may connect to the bypass control line 520 and to ground 524. When the bypass switch 522 is activated, e.g., manually, the bypass relays 510 and 514 switch to bypass the audio signal through the bypass path 518 and around a digital audio transceiver 530.

Additionally, if power to the digital data encoder 500 is turned off, the bypass relays 510 and 514 may be configured to automatically switch to bypass the audio signal through the bypass path 518. Thus, when the digital data encoder 500 is powered down, it does not disrupt the audio path and thereby enables the audio source to continue to function in a normal manner. Furthermore, the bypass switch 522 may be activated manually to bypass the digital audio transceiver 530 without having to disconnect the power from the digital data encoder 500. Additionally, a control line 532 may connect the digital audio transceiver 530 to the bypass control line 520 via a general purpose digital output (GPO), operable for automatically activating the bypass relays 510 and 514 for bypassing the digital audio transceiver 530.

In some examples, the digital audio transceiver 530 may correspond to the data embedded encoder 126 discussed above with respect to FIG. 1. As one example, the digital audio transceiver 530 may be an integrated digital audio interface receiver and transmitter commercially available for use in broadcast digital audio systems, such as from Texas Instruments, Inc. of Dallas, Tex., USA. The digital audio transceiver 530 may include a digital interface receiver 536, and a digital interface transmitter 538. The digital interface transmitter 538 may include an AES encoder 540. As one example, the digital interface receiver 536 may be configured to extract the audio content from the AES protocol signal, and convert the audio content to the I2S standard. The I2S standard is an electrical serial bus interface standard used for connecting digital audio devices, such as for communicating PCM audio data between integrated circuits in an electronic device. The audio signal, converted to the I2S standard, is passed on to the digital interface transmitter 538 which uses the AES encoder 540 to encode the audio signal with embedded data and convert the encoded I2S standard audio signal with the embedded data back to the AES standard. The AES encoder may recover the clock from the audio signal using a PLL (Phased Lock Loop). Examples of sampling frequencies to which the audio signal may be attenuated include 44.1 kHz (i.e., compact disc format) and 48 kHz (e.g., digital audio tape, DVD, and Blu-Ray video), but implementations herein are not limited to any particular sampling rate.

In the illustrated example, two reference clocks (e.g., AC signals) are provided, including a first reference clock 542 at 24.576 MHz and a second reference clock 544 at 22.5792 MHz. The reference clocks 542 and 544 may be used to internally generate 48 kHz and 44.1 kHz clocks, respectively. For instance, the references clock 542 or 544 may be used if the clock recovery is turned off for testing purpose or if the recovered clock is not accurate. A control line 546 from a GPO may control the position of a switch 548 for switching between the first reference clock 542 and the second reference clock 544.

A computing device 550 may be in communication with the digital audio transceiver 530 for controlling the functions of the digital audio transceiver 530. In some examples, the computing device 550 may correspond to the control computing device 124 discussed above with respect to FIG. 1. The computing device 550 may include one or more processors 552, one or more communication interfaces (I/Fs) 554, and one or more computer-readable media (CRM) 556. The computer-readable media 556 may include at least an encoding program 558 that is executed by the processor(s) 552 to control the digital audio transceiver 530 for embedding data in the audio content. For example, the data may be embedded in the audio content by extracting a psychoacoustic mask from the audio content and placing the embedded data into the psychoacoustic mask, as described above with respect to FIG. 4.

The processor(s) 552 may be implemented as one or more microprocessors, microcomputers, microcontrollers, digital signal processors, central processing units, state machines, logic circuitries, and/or any devices that manipulate signals based on operational instructions. In some cases, the processor(s) 552 may be one or more hardware processors and/or logic circuits of any suitable type specifically programmed or otherwise configured to execute the algorithms and processes described herein. The processor(s) 552 can be configured to fetch and execute computer-readable processor-executable instructions stored in the computer-readable media 556.

Depending on the configuration of the computing device 550, the computer-readable media 556 may be an example of tangible non-transitory computer storage media and may include volatile and nonvolatile memory and/or removable and non-removable media implemented in any type of technology for storage of information such as computer-readable instructions, data structures, program modules, or other data. The computer-readable media 556 may include, but is not limited to, RAM (random access memory), ROM (read only memory), EEPROM (electrically erasable programmable read only memory), flash memory, solid-state storage, magnetic disk storage, optical storage, and/or other computer-readable media technology. Further, in some cases, the computing device 550 may access external storage, such as storage arrays, network attached storage, storage area networks, cloud storage, or any other medium that can be used to store information and that can be accessed by the processor 552 directly or through another computing device or the one or more networks 106. Accordingly, the computer-readable media 556 may be non-transitory computer storage media able to store instructions, programs, or components that may be executed by the processor(s) 552. Further, when mentioned, non-transitory computer-readable media exclude media such as energy, carrier signals, electromagnetic waves, and signals per se.

The computer-readable media 556 may be used to store and maintain any number of functional components that are executable by the processor 552. In some implementations, these functional components comprise instructions or programs that are executable by the processor 552 and that, when executed, implement operational logic for performing the actions attributed above to the computing device 550. Functional components of the computing device 550 stored in the computer-readable media 556 may include the encoding program 558. Additional functional components may include an operating system (not shown in FIG. 5) for controlling and managing various functions of the computing device 550 and for enabling basic user interactions with the computing device 550.

In addition, the computer-readable media 556 may also store data, data structures and the like, that are used by the functional components, as well as other functional components and data, which may include applications, programs, drivers, etc. Further, the computing device 550 may include many other logical, programmatic and physical components, of which those described are merely examples that are related to the discussion herein.

The communication interface(s) 554 may include one or more interfaces and hardware components for enabling communication with various other devices, such as over the network(s) 106 or directly, such as through one or more busses connected to the digital audio transceiver 530. For example, communication interface(s) 554 may enable communication through one or more of the Internet, cable networks, cellular networks, wireless networks (e.g., Wi-Fi) and wired networks, as well as close-range communications such as BLUETOOTH®, and the like, as additionally enumerated elsewhere herein.

In some examples, a control bus 560 may enable communication of control signals from the computing device 550 to the digital audio transceiver 530. As one example, the control bus 560 may enable I2C communications. I2C is a two-wire serial transfer protocol that may be used to configure the digital audio transceiver 530, such as by sending instructions from the processor(s) 552 to the digital interface receiver 536 and/or the digital interface transmitter 538.

In addition, a data bus 562 connects a bidirectional tri-state buffer between the computing device 550 and the digital audio transceiver 530. As one example, the data bus 562 may be an I2S audio transport serial bus. For instance, I2S is a serial bus interface standard used for connecting digital audio devices. In some cases, data to be embedded in the audio content is sent over the data bus 562 by the processor(s) 552 from the computing device 550 to the digital audio transceiver 530. The data to be embedded may be buffered in the bidirectional tri-state buffer 564 until the AES encoder 540 is ready to encode the next piece of data in the audio content. An "enable" control signal line 566 connected between a GPO and the bidirectional tri-state buffer 564 allows a control signal to be sent, e.g., from the AES encoder, to enable the bidirectional tri-state buffer 564 to provide the next data in the queue from the bidirectional tri-state buffer 564. In addition, in some cases, the computing device 550 may receive data from the digital audio transceiver 530 via the data bus 562 and the bidirectional tri-state buffer 564, such as data that may be extracted by the digital interface receiver 536.

Additionally an auxiliary data bus 570 connects a tri-state buffer 572 between the computing device 550 and the digital audio transceiver 530. As one example, the auxiliary data bus 570 may be a serial bus for transmitting non-audio data, such as text data or image data. In some cases, non-audio data to be embedded in the audio content is sent over the data bus 570 by the processor(s) 552 from a general purpose digital input/output port (GPIO) on the computing device 550 to the digital audio transceiver 530. The data to be embedded may be buffered in the tri-state buffer 572 until the AES encoder 540 is ready to encode the next data in the audio content. An "enable" control signal line 574 connected between a GPO and the tri-state buffer 572 allows a control signal to be sent, e.g., from the AES encoder, to enable the tri-state buffer 572 to provide the next data in the queue from the tri-state buffer 572.

After the data is embedded in the audio content, the audio signal is converted to AES3 or other suitable format by the AES encoder 540, and passed through the bypass relay 514. The audio signal further passes through an isolation transformer 580 on the output side 516, and to an output connector 582, as audio content output 584. In some examples, the output connector may be an XLR connector, although implementations herein are not limited to any particular connector type. Accordingly, the audio content may be output to the next component in the system, such as in the system discussed above with respect to FIGS. 1 and 2.

As one example, the embedded data may include audio content ID (e.g., a universal ID) and broadcast station ID or other audio source ID. This information and additional context-based information, such as a timestamp and/or location information, can be added to the audio in real time. These embedded data can be decoded by the client application on an electronic device that receives the audio content, such as received via a microphone, a radio tuner, or by receiving the audio through streaming or download. The communication of the client applications on the electronic devices that receive the encoded audio content with the service computing device(s) provide analytics regarding audience reach and user interaction with the audio content.

Figure 6:
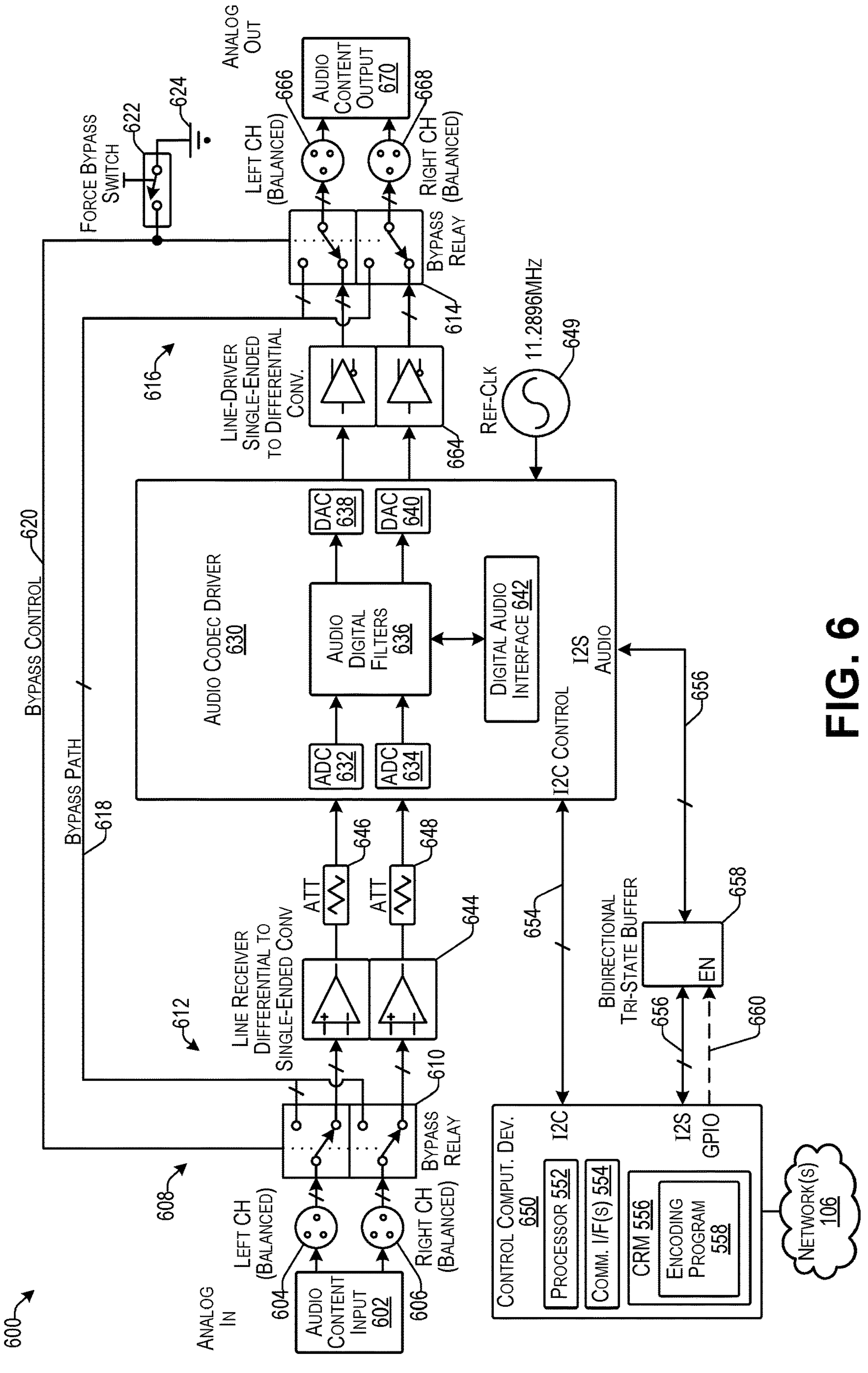
FIG. 6 illustrates an example circuit of an analog data encoder according to some implementations.

FIG. 6 illustrates an example circuit of an analog data encoder 600 according to some implementations. For instance, the analog data encoder 600 may be may be included in the audio encoder 102 discussed above with respect to FIG. 1, and may receive an audio content input 602, such as discussed above with respect to FIGS. 1 and 2. In the illustrated example, the analog data encoder 600 may receive the audio content input 602 as a left channel via a left input connector 604 and as a right channel via a right input connector 606. The input connectors 604 and 606 may be balanced analog XLR connectors or other suitable connectors.

Similar to the digital data encoder 500 discussed above, the analog data encoder 600 may include a bypass circuit 608 including a first bypass relay 610 on an input side 612, and a second bypass relay 614 on an output side 616. The bypass circuit 608 may further include a bypass path 618 leading from the first bypass relay 610 to the second bypass relay 614. The bypass circuit 608 may further include a bypass control line 620 that connects to the first bypass relay 610 and the second bypass relay 614. A bypass switch 622 may connect to the bypass control line 620 and to ground 624. When the bypass switch 622 is activated, e.g., manually, the bypass relays 610 and 614 switch to bypass the audio signal through the bypass path 618 and around an audio codec driver 630.

If power to the analog data encoder 600 is turned off, the bypass relays 610 and 614 may be configured to automatically switch to bypass the audio signal through the bypass path 618. Thus, when the analog data encoder 600 is powered down, it does not disrupt the audio path and thereby enables the audio source to continue to function in a normal manner. Furthermore, the bypass switch 622 may be activated manually to bypass the analog data encoder 600 without having to disconnect the power from the analog data encoder 600.

In some examples, the audio codec driver 630 may correspond to the data embedded encoder 126 discussed above with respect to FIG. 1. As one example, the audio codec driver 630 may be a stereo CODEC (coder/decoder) with a programmable sample rate, such as from WOLFSON® Microelectronics PLC, of Edinburgh, UK. The audio codec driver 630 may include a left channel analog-to-digital converter (ADC) 632, a right channel ADC 634, audio digital filters 636, a left channel digital-to-analog converter (DAC) 638, a right channel DAC 640, and a digital audio interface 642. For example, the audio codec driver 630 may receive the audio content as an analog signal input, convert the analog signal to digital I2S format, embed data in the digital audio content, and convert the digital I2S format back to an analog audio signal.

The input left and right channels pass through a line receiver differential to single ended converter 644, which may be a transformer that converts a balanced (differential) audio signal to a single ended signal. The left and right channels pass through respective radiofrequency (RF) attenuators 646 and 648. For example, RF attenuators 646, 648 may protect the audio codec driver 630 from receiving a signal level that is too high, and may provide an accurate impedance match controlled signal level. In addition, a reference clock 649 (e.g., an AC signal) is provided at 11.2896 MHz. The reference clock 649 may be used to resample the output analog signal to 44.1 kHz or 48 kHz.

A computing device 650 may be in communication with the audio codec driver 630 for controlling the functions of the audio codec driver 630. In some examples, the computing device 650 may correspond to the control computing device 124 discussed above with respect to FIG. 1. The computing device 650 may be same as, or similar to, the computing device 550 discussed above, and may include the one or more processors 552, the one or more communication interfaces (I/Fs) 554, and the one or more computer-readable media (CRM) 556, with at least an encoding program 558 that is executed by the processor(s) 552 to control the audio codec driver 630 for embedding data in the audio content via the digital audio interface 642. For example, the data may be embedded in the audio content by extracting a psychoacoustic mask from the audio content and placing the embedded data into the psychoacoustic mask, as described above with respect to FIG. 4.

In some examples, a control bus 654 may enable communication of control signals from the computing device 650 to the audio codec driver 630. As one example, the control bus 654 may enable I2C communications. I2C is a two-wire serial transfer protocol that may be used to configure the audio codec driver 630, such as by sending instructions from the processor(s) 552 to the digital audio interface 642.

In addition, a data bus 656 connects a bidirectional tri-state buffer 658 between the computing device 650 and the audio codec driver 630. As one example, the data bus 656 may be an I2S audio transport serial bus. In some cases, data to be embedded in the audio content is sent over the data bus 656 by the processor(s) 552 from the computing device 650 to the audio codec driver 630. The data to be embedded may be buffered in the bidirectional tri-state buffer 658 until the digital audio interface 642 is ready to encode the next data in the audio content. An "enable" control signal line 660 connected between a GPIO and the bidirectional tri-state buffer 658 allows a control signal to be sent from the computing device 650 to enable the bidirectional tri-state buffer 658 to provide the next data in the queue from the bidirectional tri-state buffer 658. In addition, in some cases, the computing device 650 may receive data from the audio codec driver 630 via the data bus 656 and the bidirectional tri-state buffer 658, such as data that may be extracted by the audio codec driver 630.

After the data is embedded in the audio content, the audio signal is converted from the I2S format back to an analog audio signal by the DACs 638 and 640, and passed to a differential line driver 664 on the output side 608. The differential line driver 664 may be a transformer that converts the single-ended audio signal from the DACs 638, 640 to a balanced (differential) analog signal. The audio signal further passes through bypass relay 614 on the output side 616, and to a pair of output connectors including a left channel output connecter 666 and a right channel output connector 668, as audio content output 670. In some examples, the output connectors 666, 668 may be analog XLR connectors, although implementations herein are not limited to any particular connector type. Accordingly, the analog audio content may be output to the next component in the system, such as in the system discussed above with respect to FIGS. 1 and 2.

Figure 7:
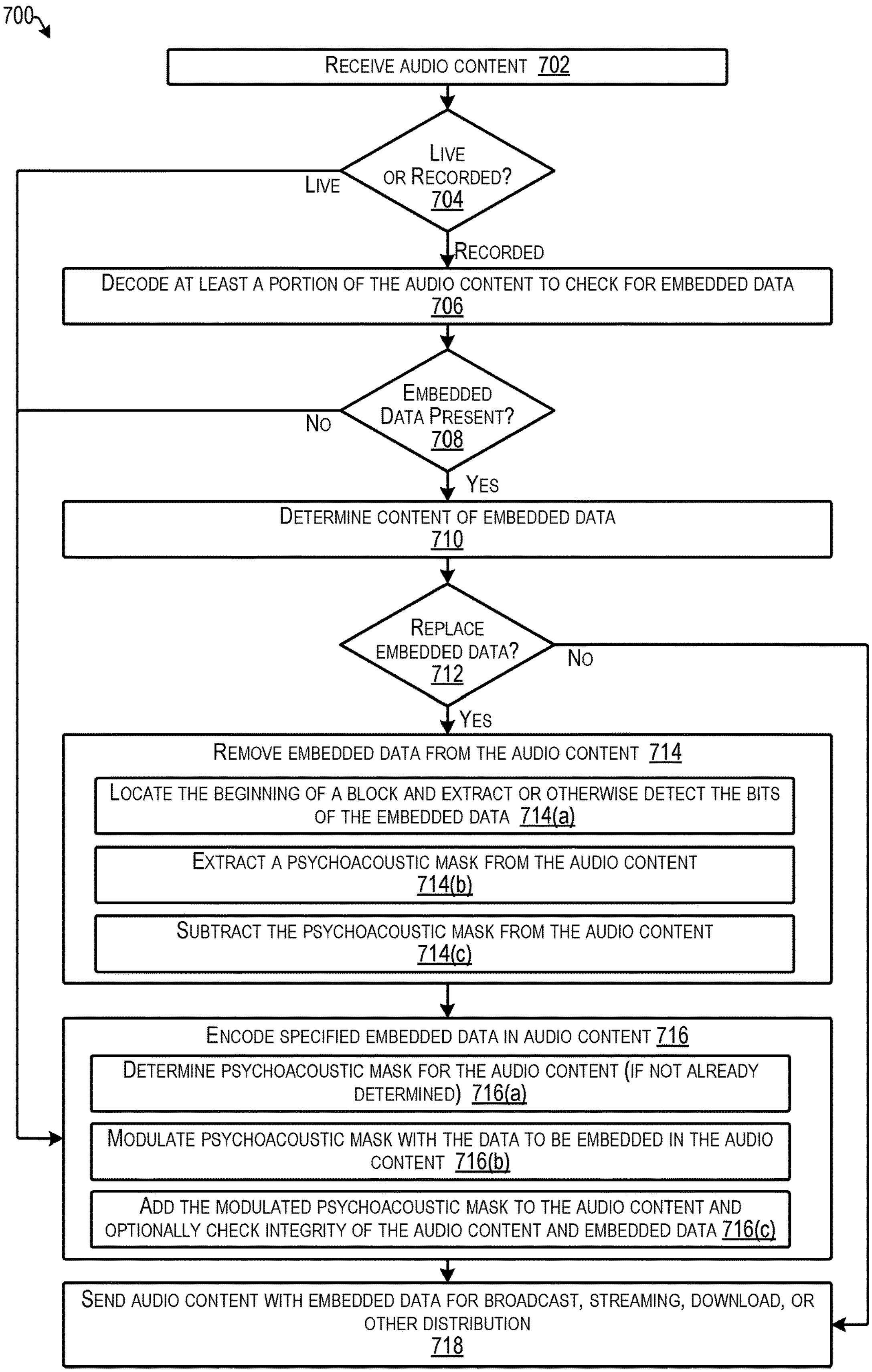
FIG. 7 is a flow diagram illustrating an example process for determining whether audio content has embedded data already embedded in the audio content, removing the embedded data, and replacing the removed embedded data with different embedded data according to some implementations.

FIG. 7 is a flow diagram illustrating an example process 700 for determining whether audio content has embedded data already embedded in the audio content, removing the embedded data, and replacing the removed embedded data with different embedded data according to some implementations. The process 700 may be carried out by the audio encoder in real time or near real time, such as under control of the encoding program 558 maintained on the computing device 550, 650 discussed above with respect to FIGS. 5 and 6, respectively. In some examples, the process 700 may correspond to at least a portion of blocks 204, 212, and 218 discussed above with respect to FIG. 2.

At 702, the audio encoder may receive audio content. As mentioned above, various different types of audio may be distributed according to the implementations herein, and may or may not include embedded data. For example, live audio, such as live talk, live music, etc., does not yet have any data embedded at this point. On the other hand, recorded audio, such as songs, recorded programs, advertisements, and station promotions, may or may not have data already embedded in the recorded audio. Accordingly, the recorded audio may be treated differently than the live audio and may first be decoded and checked for embedded data. Further, if embedded data is found, it may be determined whether it is desirable for the embedded data to be erased from the audio content and replaced with different embedded data.

At 704, the audio encoder may determine if the received audio content is live or recorded. Various different techniques may be applied for indicating whether a particular audio signal is live or recorded. As one example, a signal may be sent from the data computing device to the audio encoder control computing device to indicate whether received audio is live or recorded. As another example, the audio encoder control computing device may determine a line or other source from which the audio signal is received, e.g., from a first line associated with live audio or a second line associated with recorded audio, and so forth. If the process determines that the audio signal is live, the process may proceed to block 716. On the other hand, if the process determines that the audio signal is recorded, or if the process is unable to determine whether the audio content is live or recorded, the process may proceed to block 706.

At 706, the audio encoder may decode a block or other portion of the audio content to determine whether data has been previously embedded in the audio content. For instance, the audio encoder may decode a portion of the audio without error correction. In some cases, a marker may be included in the embedded data, such as a 1-bit flag or ultrasound marker, to indicate the beginning of an embedded data payload. Thus, as one example, the audio encoder may detect whether the marker is present. Alternatively, as another example, the audio encoder may proceed to decode a larger portion of the audio content and may decode any embedded data.

At 708, the audio encoder determines whether embedded data is present in the audio content. If not, the process goes to block 716. If so, the process goes to block 710.

At 710, the audio encoder determines the content of the embedded data. For example, the audio encoder may decode a sufficient portion of the embedded data to determine the embedded data identifier, the station identifier or other source identifier, a content identifier, or the like. In some examples, the embedded data may include some or all of the following identifying information (e.g., as discussed above with respect to FIG. 3): a start-of-frame indicator (e.g., 8 bits), a universal ID (e.g., 32 bits), a timestamp (e.g., 32 bits), location information (e.g., 24 bits), station or other source ID (e.g., 4 bits), and an end-of-frame indicator (e.g., 8 bits), at least some of which may serve as a pointer to additional content in some cases.

At 712, the audio encoder may determine whether to replace the embedded data currently embedded in the audio content. As one example, the audio encoder may determine whether at least the source ID is correct, i.e., the source ID corresponds to the current station ID or other source ID. For example if the source ID is not correct, then the embedded data may be erased from the audio content and replaced with new embedded data. Thus, the process may proceed to block 714. On the other hand, if the source ID is the same as the source ID for the current source, then the process may proceed to block 718.

At block 714, the embedded data may be erased from or otherwise removed from the audio content. In some cases, the process of removing the embedded data may include several phase-syncing steps. As one example, a block size may include 8192 samples. Further, 4 bits of data may be spread over 56 positions of a pseudo number (PN) sequence so that there are 224 (4×56) spread bits per block.

At 714(*a*), the audio encoder may locate the beginning of a block and extract or otherwise detect the bits of the embedded data. Accordingly, the audio encoder may scan blocks frame by frame using a pseudo number (PN) sequence. As one example, the audio encoder may scan the frames using a standard cross correlation function. A frame that has the highest cross-correlation may be determined to be the beginning of a block.

At 714(*b*), the audio encoder may extract a psychoacoustic mask from the audio content. For example, as discussed above with respect to FIG. 4, during embedding of the data into the audio content, the data is amplitude modulated with the psychoacoustic mask of a block of the audio signal so that the embedded data is not audible to humans. For instance, the human ear can nominally hear sounds in the range 20 Hz to 20,000 Hz. However, due to the effects of auditory masking, the perception of a sound may be related to not only its own frequency and intensity, but also the other sounds occurring concurrently and immediately before and after. Through auditory masking, implementations herein are able to modify audio signals in a desired manner without producing audible noise. For instance, some implementations may use the ISO/IEC MPEG-1 Standard, which utilizes psychoacoustic model 1 (layer 1 and layer 2), which the inventors herein have determined uses lower computing resources than psychoacoustic model 2 (layer 3).

At 714(*c*), the audio encoder subtracts the extracted psychoacoustic mask from the received recorded audio content to obtain the recorded audio content without the embedded data or psychoacoustic mask. During encoding, the psychoacoustic mask is modulated with data and is added to a signal (e.g., as shown and described with respect to FIG. 4 at 432). The psychoacoustic mask is that part of the audio that is inaudible to humans. There may be a situation in which some data has already encoded in an audio signal, (such as in the case, for example, of an advertisement that has already been encoded by an ad agency and is broadcasted by a radio station, or any of numerous other scenarios). In this situation, the audio signal may be checked to detect whether data is already embedded in the audio signal, and, if so, in some cases, such as to provide proper attribution to the audio source, it may be determined to re-encode new data in the audio signal. To achieve this, the psychoacoustic mask is separated out of the audio signal by subtracting from the audio signal, then removing the original embedded data and subsequently embedding the new data as discussed below and, e.g., with respect to FIG. 4 above.

At 716, the audio encoder embeds desired data in the audio content. For example, the data may be embedded by modulating the extracted psychoacoustic mask with the data to be embedded. In some examples, a portion of the data may be the same as that which was removed from the received audio content, such as the same content ID (e.g., universal ID), or the like, while one or more other portions of the newly embedded data may be different, such as a different source ID, location information, timestamp, and so forth.

At 716(*a*), the audio encoder may determine a psychoacoustic mask for the audio content if not already determined. For example, if blocks 710 through 714 are not executed, the audio encoder may determine the psychoacoustic mask for the audio content such as by utilizing psychoacoustic model 1 of the MPEG-1 standard as discussed above with respect to FIG. 4. In some cases, the psychoacoustic mask may be that same as that determined at 714(*b*) discussed above.

At 716(*b*), the audio encoder modulates (e.g., multiplies) the extracted psychoacoustic mask with the new data, e.g., as discussed above with respect to FIG. 4.

At 716(*c*), the audio encoder adds the modulated psychoacoustic mask to the audio content, e.g., as discussed above with respect to FIG. 4, and, optionally, the audio encoder may check the integrity of the audio content having the embedded data. For example, the audio encoder may check the integrity of the audio content having the embedded data by decoding and performing desired optimization, such as by correcting any incorrect bits and then re-encoding the embedded data into the audio content.

At 718, the audio encoder may send the audio content for broadcast, streaming, download, podcast, storage, or other type of distribution. Additionally, in some examples, following encoding and prior to distribution, the system may fork the audio signal for enabling various different features, such as MP3 encoding for use in simulcast (internet radio), streaming, etc.; saving a copy of the audio content locally and/or in the cloud (e.g., with appropriate time information and other metadata such as station information or other source information, program information, or the like. In addition, in some examples, edge processing may be performed for such as for determining keywords and context information, classification, logging, and so forth. Furthermore, when determining context, a 5-7 second delay typically built into radio broadcasts may be taken into consideration when determining the correct context for the audio content.

Figure 8:
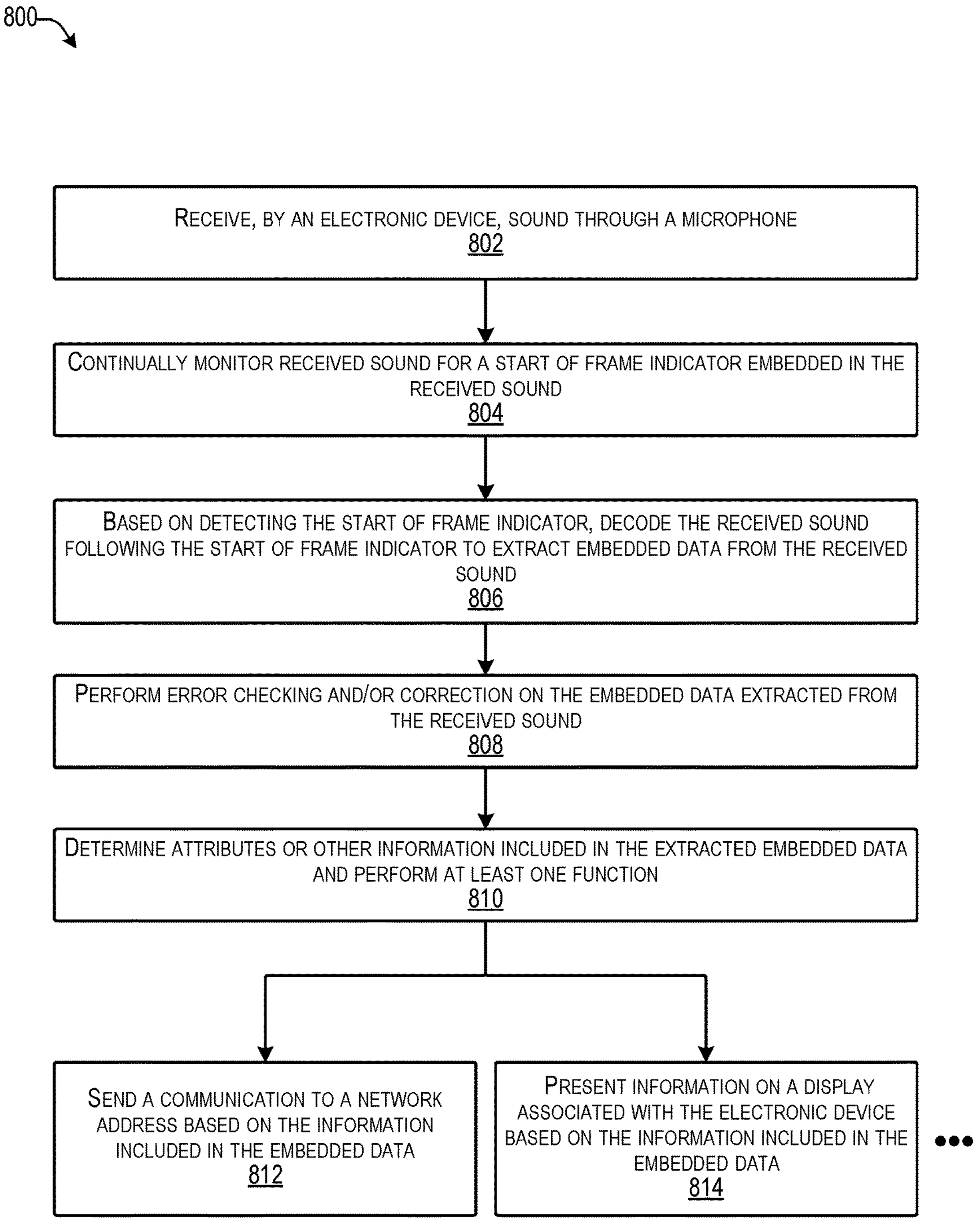
FIG. 8 is a flow diagram illustrating an example process executed by an electronic device when receiving audio with embedded data as soundwaves through a microphone according to some implementations.

FIG. 8 is a flow diagram illustrating an example process 800 performed when receiving audio with embedded data a soundwaves through a microphone according to some implementations. In some examples, the process 800 may be performed by one of the electronic devices discussed above, such as by executing the client application on the respective electronic device.

At 802, an electronic device may receive sound through a microphone. As several examples, the sound may be emitted from a radio that receives the sound in a radio transmission, may be emitted by a television that receives the sound in a television transmission, may be emitted by an electronic device that receives the sound as a streaming transmission, may be emitted by an electronic device that plays back a downloaded file, and so forth. Accordingly, implementations are not limited by the source of the sound.

At 804, an application executing on the electronic device may continually monitor received sound for a start-of-frame indicator embedded in the received sound. For example, the monitoring may be performed as discussed above with respect to blocks 706 and 708 of FIG. 7.

At 806, based on detecting the start of frame indicator, the application decodes the received sound following the start of frame indicator to extract embedded data from the received sound.

At 808, the application may perform error checking and/or correction on the extracted data. For instance, implementations herein may employ error checking and correction techniques to retrieve original information that is corrupted by noise or other impairments. Error checking/correction may be performed by adding extra data to the signal for redundancy. Accordingly, there may be a tradeoff between error checking and payload size. As one example, error checking may be performed by creating a checksum (or hash function) of the data, which may be used to check against the extracted data. If the checksum matches then there is no error in the received data. On the other hand, if checksum does not match, then the additional data that was embedded in the audio signal may be used by the client application to recover the original embedded data. As one example, an error correction code may generates a polynomial function of the data, and this polynomial function may be used to recover the missing data by performing a curve fit or interpolation to determine the missing data. The higher the number of error codes included in the audio signal, the more errors can be recovered; however, this comes at the cost of reduced throughput per unit time. Some examples herein may employ an error correction technique known as "Golay code", but implementations herein are not limited to any particular error correction technique.

FIG. 9 illustrates example matrices 900 that may be employed during error correction according to some implementations. In this example, for error correction, a cyclic error correction code and a Golay [23,12] code word may be employed with 12 information bits and 11 (i.e., 23-12) check bits. For instance, if the Golay code word is cyclically shifted, then the result is also a Golay code word.

This cyclic code property allows the extracted data to be checked using a cyclic redundancy check (CRC). For example, if the extracted data is determined to be correct based on the CRC, then it is not necessary to wait for rest of the code. This property ensures faster decoding of the embedded data in low noise situations. The encoding scheme herein consists of 23×4 bits, which, as illustrated in FIG. 7, includes two sections, namely a 12×4 matrix 902 and an 11×4 matrix 904.

In the 12×4 matrix 902, the first three rows 906, 908 and 910 are filled with sixteen bits for a universal ID i.e., $UID_0$-$UID_{15}$, sixteen bits for CRCs, i.e., $CRC_0$-$CRC_{15}$, and four bits for the source ID $SID_0$-$SID_3$, which are considered part of the CRC and checked during decode. The last row 912 is filled with parity bits. In addition, the 11×4 matrix 904 may be filled with Golay codes, e.g., $Gcode_0$-$Gcode_{43}$. As an example, the analog payload may include a 16 bit universal ID and a 4 bit source ID (i.e., 20 bits total). During embedding of the payload into the audio content, to be able to decode the payload at any point in time, a 16 bit CRC may be appended to the 20 bit payload. This makes the total size of the payload 36 bits.

During Golay encoding, the 36 bit payload may be split into 3 Golay (23, 12) codes. Each of these codes constitutes one row in the 23×4(23 columns and 4 rows) matrix of the payload. The first 12 bits of the 4th row may constitute parity correction for the first 3 rows. These 12 bits may be again converted to a Golay (23, 12) code, thereby completing the 4th row of the matrix. Each of the columns (so that its resistant to time shifting) of this 23*4 matrix may be watermarked into a 8192 block of the audio buffer. For instance, the raw payload may be 4 bits per 8192 block of audio. Subsequent, during decoding every 8192 buffer of the audio sample yields 4 bits of decoded data that corresponds to one column in the matrix. As mentioned above, 23 of these columns form a complete the matrix and may be decoded using a Golay decoder. One row of the matrix may be decoded at a time, with each row being a valid code. Since this is a cyclic code, where circular shift of the code word belongs to the same code, it is useful for detecting errors with random starting points. For example, by performing circular permutations of each column the result may end up with 23 possibilities, and each of these possibilities may provide one candidate for universal ID and source ID+CRC taken from the first 3 rows. By allowing 1 row error, it is possible to reconstruct it by taking the parity of other 3 rows. Finally, a CRC validation may be performed to ensure that the correct universal ID and source ID have been received Furthermore, noise and associated errors may often only be an issue in analog transmissions such as sound or radio waves. In the case of digital transmissions (e.g., streaming, on-demand, podcasts, etc.), there is not typically any substantial noise added to the signal and therefore error correction codes can be omitted which will result in a substantially higher data throughput for the same length of audio content than in the analog case.

Returning to FIG. 8, at 810, the application determines the attributes or other information included in the extracted embedded data and performs at least one function.

At 812, as one example, the application may send a communication to a network address based on the information included in the embedded data. For example, the application may send information about the source of the embedded data, information about the audio content, information about a program in which the audio content is included, information about an artist who created the audio content, a timestamp associated with the audio content, or the like, any of which may serve as a pointer for determining additional content for the service computing device to send to the particular electronic device.

Figure 10:
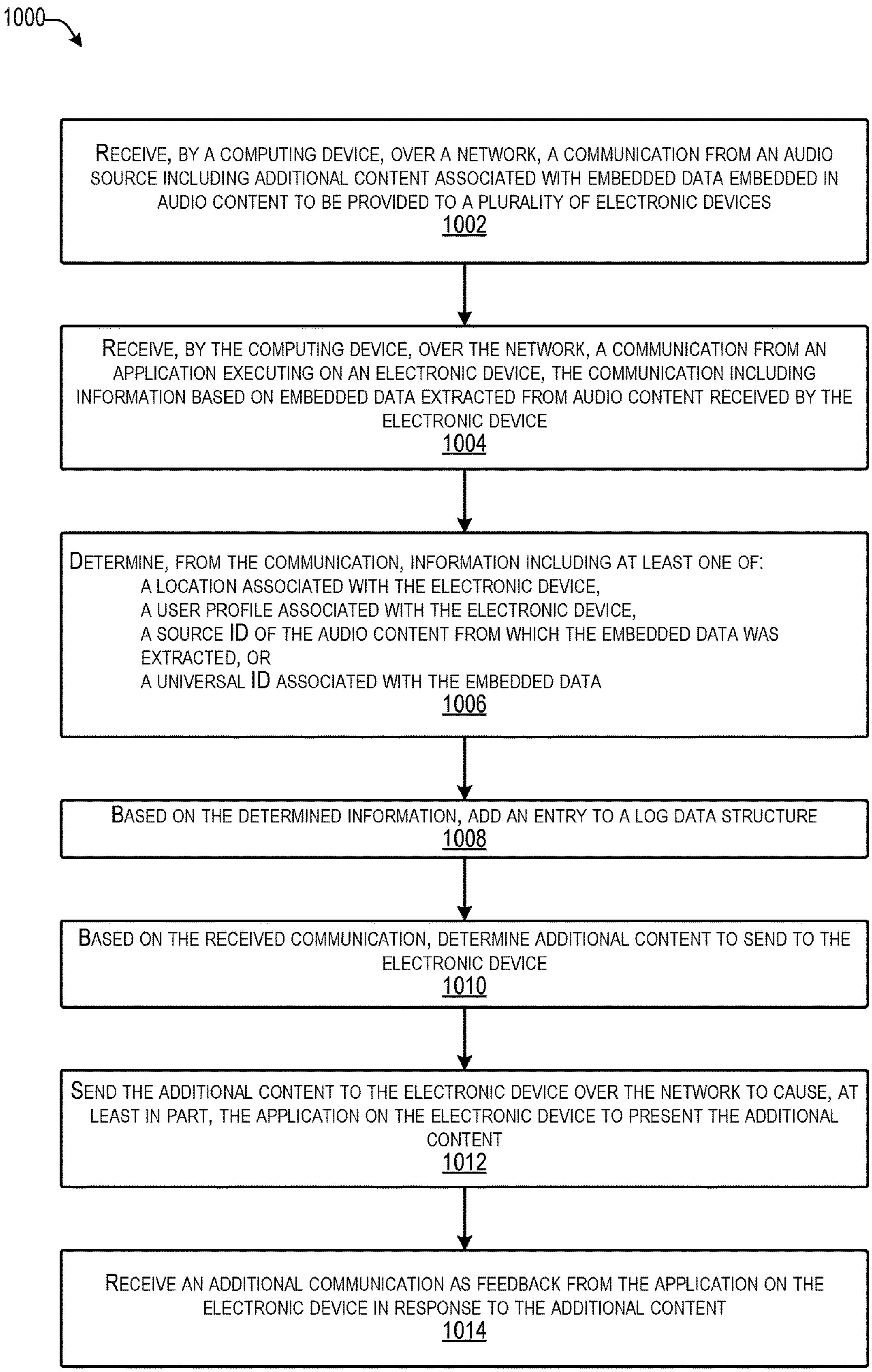
FIG. 10 is a flow diagram illustrating an example process for serving additional content according to some implementations.

At 814, as another example, the application may present information on a display associated with the electronic device based on the information included in the embedded data. For example, the application may present a phone number, a coupon, an image, or the like. Furthermore, various other types of actions are possible with the foregoing being only several examples included for discussion purposes. Numerous other variations will be apparent to those of skill in the art having the benefit of the disclosure herein FIG. 10 is a flow diagram illustrating an example process for serving additional content according to some implementations. In this example, the process may be executed by one or more of the service computing devices 155 discussed above with respect to FIG. 1, such as by the server program 159 and the logging program 160 executed on the one or more service computing devices 155.

At 1002, the computing device may receive, over a network, a communication from an audio source including additional content associated with embedded data embedded in audio content to be provided to a plurality of electronic devices. In some examples, the computing device may store the received additional content in a Web CMS repository in association with an identifier of the audio content, the source of the audio content, or the like.

At 1004, the computing device may receive, over a network, a communication from an application executing on an electronic device, the communication including information based on embedded data extracted from audio content received by the electronic device.

At 1006, the computing device may determine, from the communication, information including at least one of: a location associated with the electronic device, a user profile associated with the electronic device, a source ID of the audio content from which the embedded data was extracted, or a universal ID associated with the embedded data.

At 1008, based on the determined information, the computing device may add one or more entries to a log data structure. Additional details of logging, analysis, presentation, and recommendations/applications are discussed below with respect to FIGS. 11 and 12.

At 1010, based on the received communication, the computing device may determine additional content to send to the electronic device. In some examples, the computing device may connect the client application on the electronic device with the CMS repository for the particular audio content that the electronic device is receiving to enable the client application to access the additional content in the CMS repository. For example, timestamps may be associated with the additional content in the CMS repository, and the client application may access and download the additional content based on matching the timestamps associated with the additional content with timestamps extracted from the audio content received at the electronic device.

At 1012, the computing device may send the additional content to the electronic device over the network to cause, at least in part, the client application on the electronic device to present the additional content. For example, the client application may request the additional content from the CMS repository based on timestamps extracted from the audio content received at the electronic device, or based on any of various other pointers extracted from the audio content. In some cases, the additional content may be pushed to the client application based on the web server having received a communication from the client application indicating that the electronic device is receiving particular audio content. As one concrete example, suppose that the audio source decides to give away concert tickets to the 50th person to call the station, and sends a telephone number for the audience to dial to the service computing device. The service computing device may push the telephone number to all of the client applications on electronic devices that are currently indicated to be tuned to the audio source based on the communications received from the client applications. The client applications may receive the phone number and may present the phone number on the respective screens of their respective electronic devices.

At 1014, the computing device may receive an additional communication as feedback from the client application on the electronic device in response to the additional content. For example, if the additional content includes a URL, and the user clicks on the URL, the client application may send a communication to the service computing device based on this action by the user.

Figure 11:
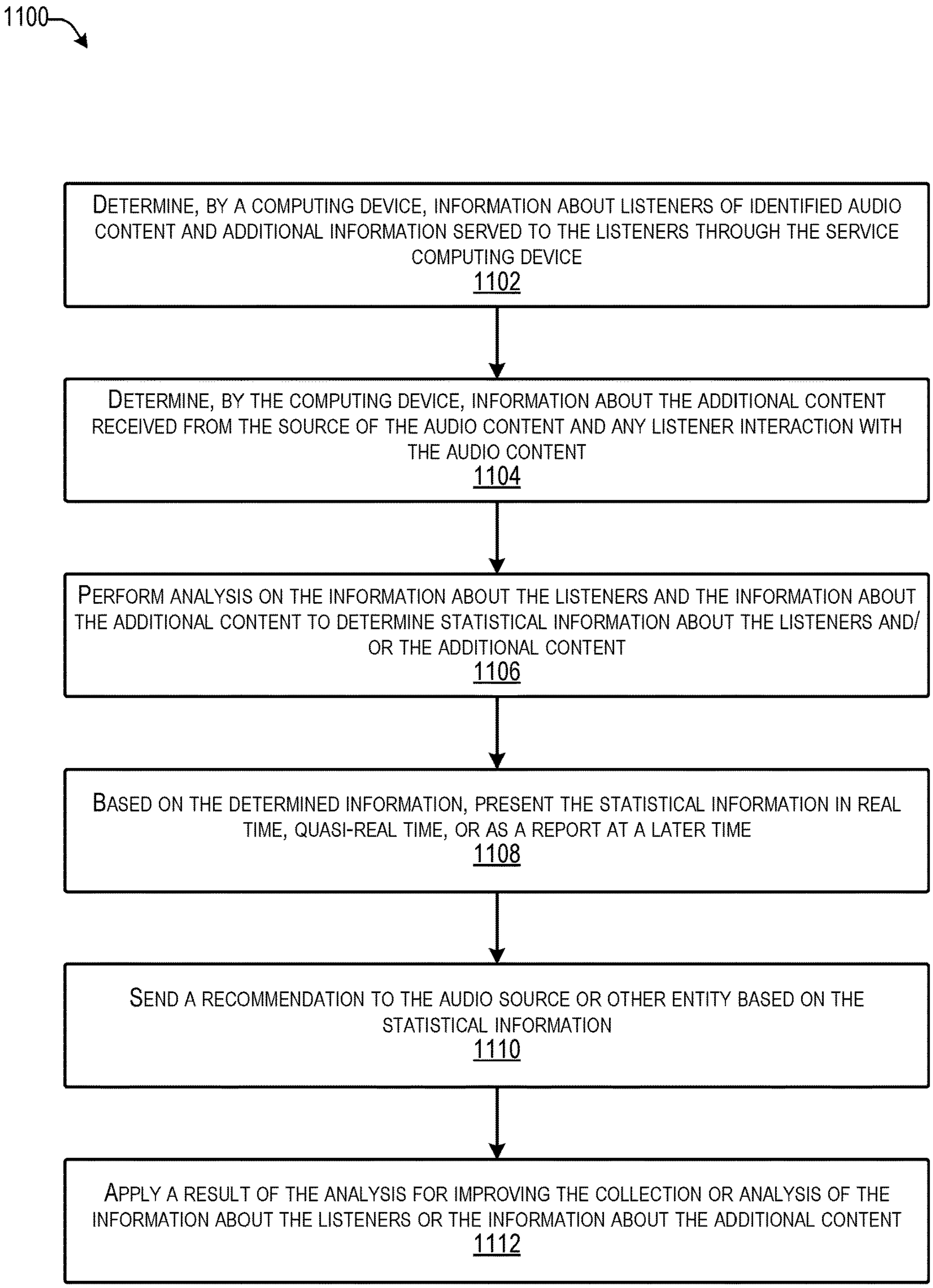
FIG. 11 is a flow diagram illustrating an example process for logging and analyzing data according to some implementations.

FIG. 11 is a flow diagram illustrating an example process 1100 for logging and analyzing data according to some implementations. In this example, the process may be executed by one or more of the service computing devices 155 discussed above with respect to FIG. 1, such as by the logging program 160 executed on the one or more service computing devices 155.

At 1102, the computing device may determine information about listeners of identified audio content and additional information served to the listeners through the service computing device. For example, the computing device may access a log data structure that is maintained by the logging program and/or various other data structures for determining information about the listeners of the identified audio content.

FIG. 12 illustrates an example log data structure 1200 according to some implementations. In this example, individual log events may be recorded by the logging program for use in analysis of the audience, geographic reach of the content, listener interaction with the content, and so forth. In this example, four log events 1202, 1204, 1206, and 1208 are illustrated, although there may be thousands, tens of thousands, or more actual log events recorded per individual piece of audio content, such as per song, per broadcast program, or the like. In this example, the log events may be include various information, such as an absolute time, an offset time, an episode ID, and a user ID. In addition, in some cases, such as when an audience member interacts with the additional content, the action performed by the audience member may be indicated in the log. For example, as indicated in log event 1206, a tag ID may identify the additional content that the audience member interacted with, and the action may indicate what action was performed by the audience member, such as clicking on a URL, dialing a phone number, viewing an image, or the like. In addition, other data structures may be accessed by the logging program as well, such as a user database that includes information about users registered to use the client application, e.g., demographic information, listening habits, and so forth, as shared by the users.

Returning to FIG. 11, at 1104, the computing device may determine information about the additional content received from the source of the audio content and any listener interaction with the audio content. For example, the computing device may collect information from the Web CMS when applicable, from the Web server service computing device, or the like. Information collected about the additional content may include information about creation of the additional content, such as number and types of additional content created, the time utilized to create the additional content, the numbers and types of parameters in the additional content (e.g., if a poll is conducted, how many options are given; if a link is shared, what kind of link is it, etc.). In addition, the information about the additional content may include the time between creation of the additional content and the time when the additional content is served to a client application; a correlation between the time the additional content was kept live to the total time a the additional content experiences user interactions; comparison of types of additional content created to types of additional content published. In addition, customer interactions with the additional content may be determined (e.g., from the log data structure or the like), such as time spent by the listener viewing or otherwise interacting with additional content. In addition, in some examples, metadata associated with the audio content and/or the additional content may be received from the audio source.

At 1106, the computing device may perform analysis on the information about the listeners and the information about the additional content to determine statistical information about the listeners and/or the additional content. For example, the logging program may analyze the collected information to determine averages, maximums, minimums, etc., such as with respect to various parameters, e.g., the audience size, audience engagement, audience location, programming reach, and so forth. In addition, the statistical information may include correlations between values, such as the time utilized to create additional content vs. the time to publish the additional content; types of additional content that get more user responses; types of audio content that get more tune ins, and so forth. In addition, the statistical information may include gamification parameters, such as parameters that enhance the use of various features of the Web CMS, such as additional content creation milestones;

additional content interaction milestones; listener tune in milestones, etc. Further, the analysis results may enable slicing the logs collected based on time, location, and various axes of additional content and audio content.

At 1108, based on the determined information, the computing device may present the statistical information in real time, quasi-real time, or as a report at a later time. For example, the audio source may be provided with real-time feedback (such as through CMS) on some of the logs collected including but not limited to number and location of listeners; additional content served; additional content interacted with, etc. In addition, some statistical results may be provided in quasi-real time, such as a summary on a brief adaptive period of time (e.g., 15 minutes, an hour, etc.) of a mix of Web CMS user behavior and listener anonymized behavior. Furthermore, the statistical results may be presented in an interactive visual presentation, such as an interactive visual summary of the data logged over a period of time, which may be provided as a service for the customers, such as the audio sources. The interactive visual summary may include graphs, charts, and various other visual information presentation schemes. In addition, the analysis results may be used to generate reports, such as reports for particular customers (audio sources) or particular products, e.g., a PDF or printed hard copy of the analysis may be provided as a service periodically for the customers. Further, general reports may be generated for a broader audience, such as for widespread publication or the like, and which may provide a summary of insights obtained from all the data collected by the service computing device(s).

At 1110, the computing device may send a recommendation to the audio source or other entity based on the statistical information. For instance, the process of arriving at a recommendation to the customer (e.g., the audio source) may be based on the analytics is established as a continuously adaptive solution that is modifiable based on customer requirements.

At 1112, the computing device may apply a result of the analysis for improving the collection or analysis of the information about the listeners or the information about the additional content.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Figure 13:
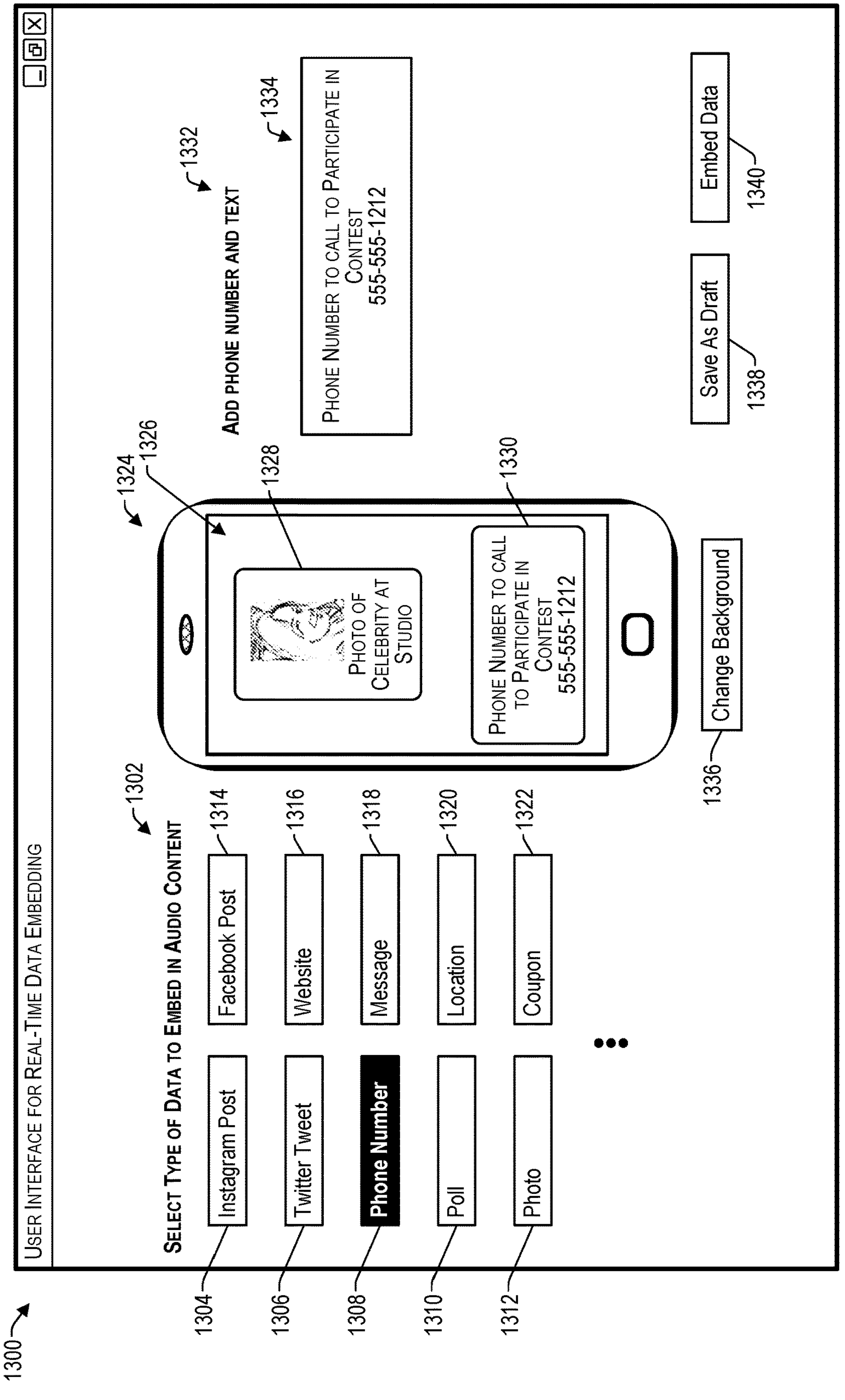
FIG. 13 illustrates an example user interface for performing real-time data embedding according to some implementations.

FIG. 13 illustrates an example user interface 1300 for performing real-time data embedding according to some implementations. For instance, the user interface 1300 may be presented on a display associated with the data computing device 120 or the remote data computing device 130 discussed above with respect to FIG. 1. For example, the user interface 1300 may be generated by a user interface application executing on the data computing device 120 and/or 130.

In this example, the user interface 1300 may include a plurality of virtual controls, as indicated at 1302, to enable the user to select a type of data to embed in the audio content or otherwise provide in association with the audio content. Accordingly, the user may select a corresponding virtual control to select a particular type of data to embed. Following the selection of the data, the user may send the selected data to the audio encoder 102 to be embedded by the audio encoder 102 in the audio content in real time or near real time. Examples of types of data that the user may select for embedding in the audio content include an INSTAGRAM® post, as indicated at 1304; a TWITTER TWEET®, as indicated at 1306; a phone number, as indicated at 1308; an audience poll, as indicated at 1310; a photograph, as indicated at 1312; a FACEBOOK® post, as indicated at 1314; a website URL, as indicated at 1316; a message, such as entered text, as indicated at 1318; a location, as indicated at 1320; and/or a coupon, as indicated at 1322. Furthermore, as mentioned above, if the data content exceeds a threshold size (e.g., in bits required to be embedded), the data content may be sent to a service computing device as additional content, and a pointer to the additional content may be embedded in the audio content instead of the actual data content.

As indicated at 1324, the user interface 1300 may include an image of an example electronic device, such as a cell phone, to give the user of the user interface 1300 an indication of how the embedded data will appear on the screen 1326 of an electronic device of an audience member. In this example, suppose that the user has already selected a photograph of a celebrity currently at the studio to include in the embedded data, and has decided to include a phone number for a call-in contest. Thus, the selected photo is already presented on the user interface 1300, as indicated at 1328, and the selected control 1308 for adding a phone number is highlighted.

Selection of the control 1308 may result in additional features 1332 being presented on the right side of the user interface 1300. For example, a text box may be presented to enable the user to enter the phone number and additional desired text. As the user enters the text in the text box 1334, the entered text may also be presented in the mockup screen 1326 of the electronic device 1324 presented in the user interface, as indicated at 1330. In addition, the user interface 1300 may include a virtual control 1336 to enable the user to select a background that is presented on the electronic device when the embedded data is presented on the electronic device. When the user has finished entering the desired information, the user may select a "save as draft" control 1338 to save the data arrangement for later, or the user may select an "embed data" control 1340 to send the selected data to the audio encoder for embedding the data in the audio content being prepared for broadcast, streaming, podcast, or other distribution. Further, for example, if the image 1328 is too large to embed in the audio content, the image may be sent to a service computing device, and a pointer to the image at the service computing device may be embedded in the audio content.

Figure 14:
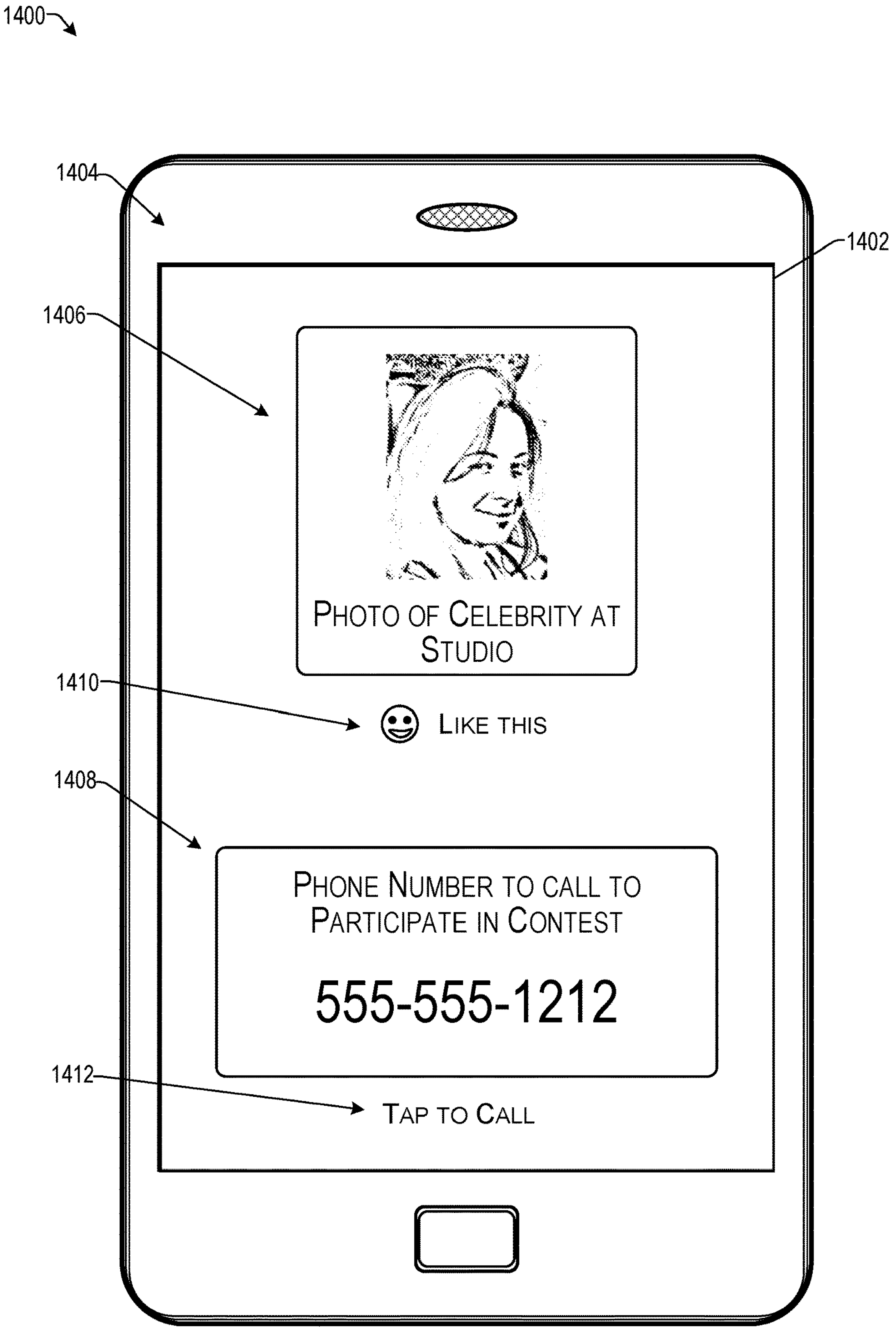
FIG. 14 illustrates an example electronic device of an audience member following reception and decoding of the embedded data discussed with respect to FIG. 8 according to some implementations.

FIG. 14 illustrates an example electronic device 1400 of an audience member following reception and decoding of the embedded data discussed above with respect to FIG. 13 according to some implementations. In this example, the electronic device 1400 includes a display 1402 on which is presented in a user interface 1404 that may be generated by the client application in response to receiving the audio content with the embedded data and extracting the embedded data from the audio content. Accordingly, in this example, the presented embedded data includes a photo 1406 of the celebrity at the studio and a telephone number 1408 for the user associated with the electronic device to call to participate in a contest. Furthermore, in the case that the photo 1406 of the celebrity was too large to embed in the audio content, the client application on the electronic device 1400 may communicate with the service computing device(s) (not shown in FIG. 14) to receive the photo 1406 as additional content based on a pointer extracted from the embedded data.

In addition, the user interface 1404 presented by the client application may include one or more calls for action, such as a virtual control 1410 for a user to like the photo 1406. As another example, the user interface 1404 may present a call for action 1412 for the user to call the telephone number presented in the user interface 1404. Various other types of calls for action may be included in other examples, such as "submit" a response or an input, or "go to" a website, URL, or the like.

Figure 15:
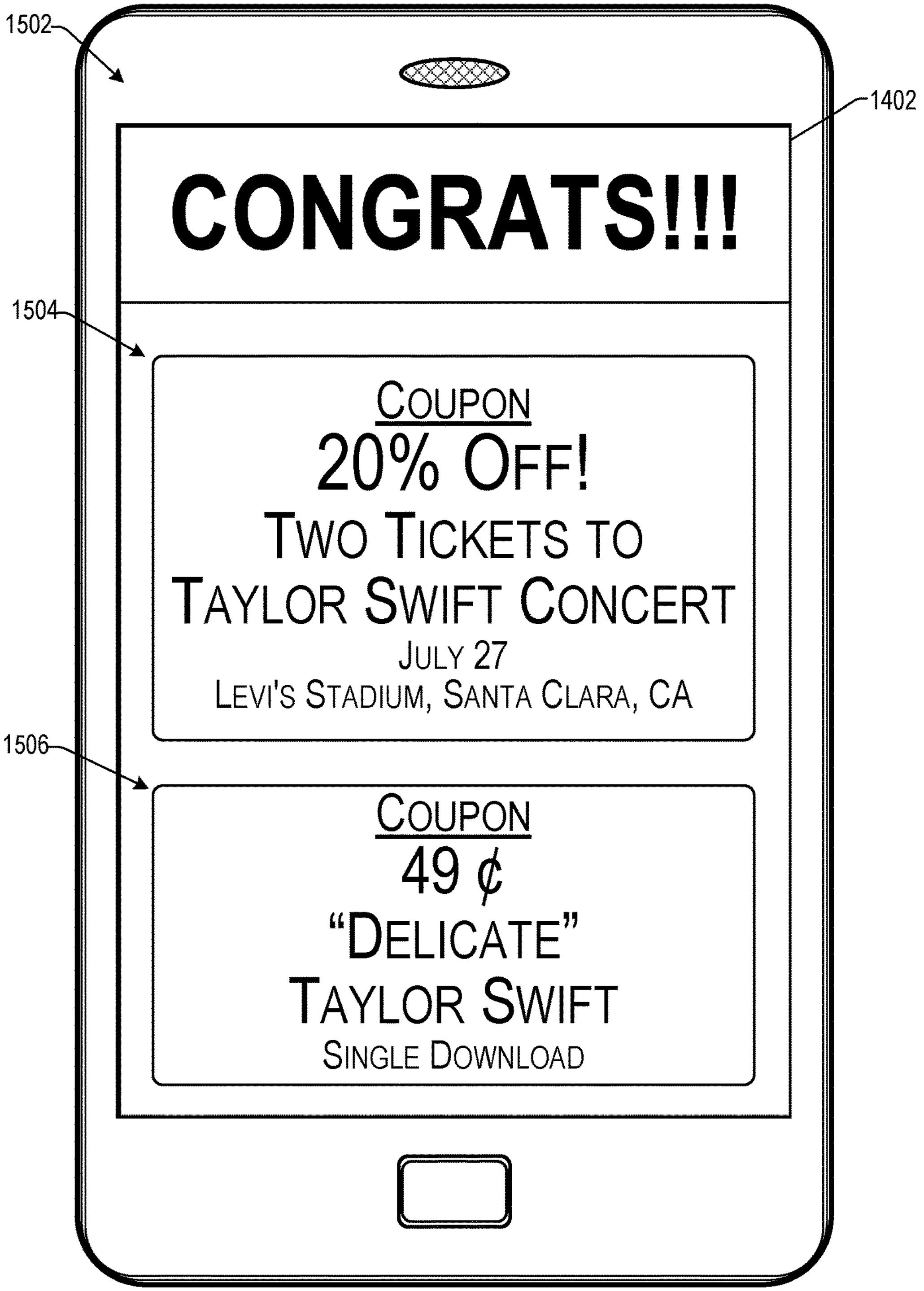
FIG. 15 illustrates an example of additional data that may be received by an electronic device following communication with a service computing device based on the extracted embedded data according to some implementations.

FIG. 15 illustrates an example of additional data that may be received by the electronic device 1400 following communication with a service computing device based on the extracted embedded data according to some implementations. In this example, suppose that in addition to presenting the user interface 1404 discussed above with respect to FIG. 14, the client application executing on the electronic device sends a communication to the service computing device in response to receiving the embedded data. In some examples, the network address of the service computing device may be a default address used by the client application, while in other examples, the network address of the service computing device may be included in the extracted embedded data.

In this example, suppose that as an incentive for allowing the client application to contact the service computing device, the service computing device sends one or more rewards to the electronic device 1400 that causes at least in part the client application to present a user interface 1502 that includes at least a portion of the additional content provided by the service computing device. For instance, suppose that the additional content provided by the service computing device to the electronic device 1400 includes a first coupon 1504 that provides the user with a discount on concert ticket for an artist associated with a song or other audio content to which the user is currently listening, and a second coupon 1506 for downloading a discounted song by the artist. Thus, in this example, suppose that the user is currently listening to a Taylor Swift song, a Taylor Swift live interview being conducted at a broadcast station, Internet radio station, podcast station, or the like, and that during the song or the live interview, the electronic device 1400 extracts embedded data from the audio of the song or the interview that causes the electronic device 1400 to obtain the coupons 1504 and/or 1506 for the Taylor Swift concert and/or the Taylor Swift song download, respectively. If the user is interested in either of the incentives, the user may select the incentives in the user interface 1502 to obtain additional information for obtaining the reward. Furthermore, while several examples are discussed herein numerous other variations will be apparent to those of skill in the art having the benefit of this disclosure herein.

Figure 16:
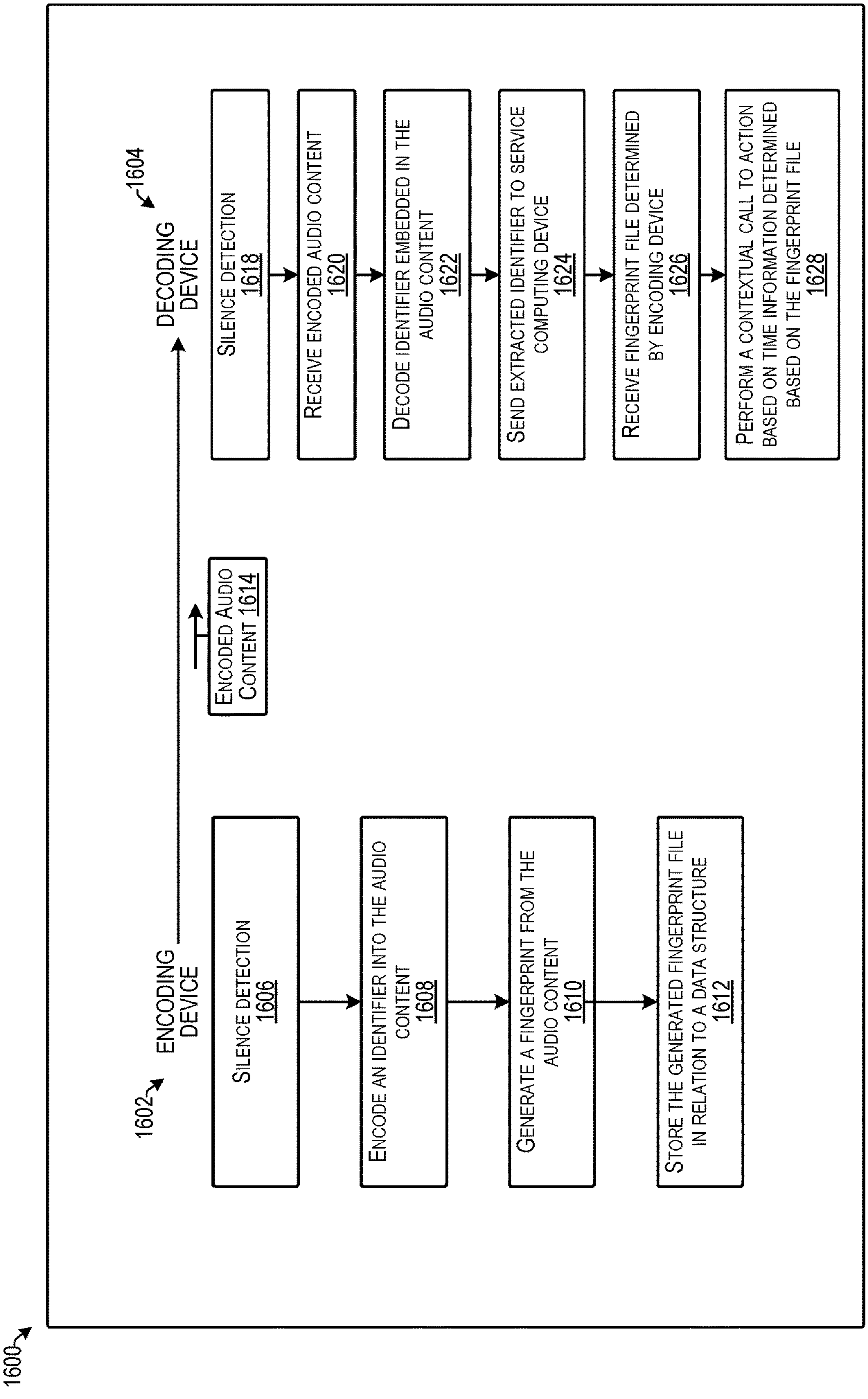
FIG. 16 is a flow diagram illustrating an example process for an audio fingerprinting technique according to some implementations.

FIG. 16 is a flow diagram illustrating an example process 1600 for an audio fingerprinting technique according to some implementations. In the examples herein, when the client application is active either in the foreground or in the background, the microphone of the electronic device may be active for attempting to detect audio content. Thus, for mobile devices and other battery-powered devices, it is desirable to minimize power consumption and thereby increase battery life.

The examples herein may employ a computationally efficient algorithm when the client application is continuously listening for audio to enable the provision of a highly contextual experience with the audio content, such as discussed above. Contextual audio retrieval has the power to provide additional relevant information (i.e., the additional content discussed above) to a listener in real time when the audio content is played. For example, if an advertisement for a fast-food restaurant is being provided as the audio content and the listener is using an electronic device, such as a mobile phone, and which, as indicated by the GPS receiver of the phone happens to be geographically close to such a location of the fast-food restaurant, the mobile phone may be served a personalized and dynamic coupon to entice the listener to use the services from the restaurant. This converts a micro moment into a contextual experience for the user, as well as a unique, powerful and scalable opportunity for brands and advertisers.

The examples herein provide not only a more robust and computationally efficient algorithm on the client side, but also a very fast data retrieval system on the server side. The audio fingerprint system herein includes a method to extract fingerprints and a method to efficiently search for matching fingerprints in a large fingerprint database or other data structure. Conventionally, the extraction of a fingerprint on the client side comes at a cost. The main cost being speed and computation time. Since the fingerprinting scheme may be always on in most cases, the computational complexity directly affects the battery life of the electronic device. In addition, as the database of the media fingerprints grows larger, the retrieval typically will take longer and may require more backend computational power. Conventionally, this would come at a cost in terms of speed and user experience. For example, a common technique for generating an audio fingerprint includes creating a time-frequency graph referred to as a spectrogram. As the generation of a spectrogram as an audio fingerprint is well known in the art, the technique will not be described in detail herein. Further, while a spectrogram is disclosed herein as one example of an audio fingerprint, other examples of suitable audio fingerprints will be apparent to those of skill in the art having the benefit of the disclosure herein.

Conventionally, a music retrieval system may extract a fingerprint from a sample of audio content and search for a match for the extracted fingerprint in a database that contains fingerprints of millions of audio samples. In some cases, the database indices may be stored as balanced tree (B-Tree) data structures. As the size of the audio fingerprint database grows, the search complexity for searching the database also grows. The complexity growth "O" is often a non-linear function of the database size "n". B-Tree databases typically have O(log n) search complexity. In other words, the search complexity increases by a logarithmic function based on the database size n.

On the other hand, the techniques herein greatly reduce the search complexity, thus improving the performance of the overall computing system. In some examples herein, this may be accomplished by embedding data (e.g., the universal ID, source ID, or other a content ID, or the like) in the audio content in a way that is not audible to a human, but is detectable by the electronic device. As discussed above, the embedded data may be inserted under a psychoacoustic mask of the audio content that may be determined based on the frequencies of the audio content. The examples herein embed data inside the inaudible portion of the audio. By using the technique of embedding an ID of the content in the audio itself, and by using a robust fingerprint extraction scheme, implementations herein are able to retrieve granular audio context with a minimal search requirement on the server side. Accordingly, the techniques herein reduce a row-by-column search problem to a column-only search problem. The column-only search may be performed in real time on the client side using the efficient client side algorithm herein.

FIG. 16 illustrates example encoding and decoding processes 1600 for performing the audio fingerprint techniques according to some implementations herein. The encoding process may be performed by at least a first device 1602 (the encoding device), and the decoding process may be performed by at least a second device 1604 (the decoding device).

At 1606, the first device may perform silence detection. For instance, silence detection may detect silent periods in the audio signals. In some examples herein, during silent periods it may be difficult to embed data in the audio signal without producing audible noise, as the psychoacoustic mask is very small, and therefore, the amplitude of the embedded data may also be very small. Thus, being able to detect and avoid or remove the silent periods makes the data embedding process more efficient. The silent periods may also be detected during decoding of the audio to increase the efficiency of the decoding the audio since there will be no data embedded in the silent periods.

At 1608, the first device may encode a content ID into audio content. For example, as discussed above, e.g., with respect to FIGS. 1-4, the first device may embed the content ID under a psychoacoustic mask determined for the audio content. The content ID may be the universal ID discussed above, the source ID, or other ID or information able to provide an indication of the identity of the audio content.

At 1610, the first device may generate a fingerprint from the audio content. For instance, as discussed additionally below, the generated fingerprint may be a time domain fingerprint, such as spectrogram, or the like.

At 1612, the first device may store the generated fingerprint as a fingerprint file in relation to a database or other type of data structure. For example, the generated fingerprint file may be sent to a service computing device and may be stored in a storage location. The service computing device may maintain a fingerprint database or other fingerprint data structure, and may store the storage location relative to the content ID that was embedded in the audio content.

At 1614, the encoded audio content may be distributed. For example, the first device or another device may stream, broadcast, send, or otherwise distribute the encoded audio content.

At 1618, the second device may perform silence detection.

At 1620, the second device may receive the encoded audio content. For example, the second device may receive the encoded audio content through any of a microphone, streaming, file download, broadcast radio or television, or the like.

At 1622, the second device may decode the received audio content to extract the content ID embedded in the audio content. For example, the embedded data may be extracted from the audio content using the psychoacoustic mask techniques discussed above.

At 1624, the second device may send the extracted content ID to a computing device, such as the service computing device(s) discussed above with respect to FIG. 1. In some examples, the embedded data may identify or otherwise indicate a network location for the client application to send the extracted content ID.

At 1626, the second device may receive a fingerprint file from the service computing device. For example, the service computing device may receive the extracted content ID and may use the received content ID to identify a corresponding fingerprint file by accessing the database using the received content ID to determine a storage location of the corresponding fingerprint file. The service computing device may retrieve and send the fingerprint file to the second device 1604 in response to receiving the extracted content ID. Thus, the implementations herein may retrieve data within a granular time context with millisecond resolution using the fast and efficient time domain fingerprint extraction process herein.

At 1628, the second device may enable a contextual call to action based on time information determined based on the received fingerprint file. For example, the extracted audio content ID is useful to identify the audio content. Furthermore, the fingerprint file received from the service computing device may be used to determine a corresponding timestamp or other time information associated with the audio content that may be used for performing a contextual call to action. For instance, as discussed above at 1610 and 1612, during encoding the first device 1602 may extract the fingerprint representation of the audio content for storage in relation to the content ID in the fingerprint data structure. For each 4K sample of audio content, a 16 bit (i.e., 2 bytes) representation of that audio content may be extracted, such as based on its energy features. So in other words, for a 44100 samples per second audio signal, on average, 21.533 bytes may represent every second of audio. The extracted 16 bits of data may be stored as a fingerprint file by the service computing device, e.g., as an "fp.bin" file.

During decoding of the embedded data in the audio content, the content ID may be extracted from the audio content, and the content ID may be sent to the service computing device. In response, the corresponding "fp.bin" fingerprint file that is stored in relation to content ID using the fingerprint data structure is received from the service computing device by the client. This fingerprint file has the 16 bit fingerprint values for every 4K samples of the audio content. Using the same process as used during encoding, the fingerprint representation of the audio that is being played may be extracted in real time at a rate in blocks of ten 4K samples.

To determining timing information for the audio content, e.g., a "timestamp", the extracted samples may be searched in comparison to the "fp.bin" fingerprint file data using, e.g., a sliding window method to find a minimum hamming distance. The point at which the best match (e.g., smallest hamming distance) is found may be converted to a time value by multiplying by 4096/44100 for determining the timestamp in seconds. Thus, the timestamp of the audio content that is being played may be determined based on the received fingerprint file. Using this timestamp, the client application on the user device may refer to a received JSON file that contains information relating contextual additional content and time. Thus, if the timestamp determined based on the fingerprint matches with timing information for contextual additional content, then that additional content may be presented to the listener according to the timing, e.g., as discussed above.

Thus, the use of the fingerprint combined with content ID as described above can enable avoidance of embedding a 32 bit timestamp in the audio content. For instance, in some examples, the throughput of embedded data in the audio content may be limited so that there may not be sufficient room to embed a timestamp or other timing information in the audio content in addition to the content ID (e.g., the universal ID, source ID, etc. discussed above, or the like).

Accordingly, some examples herein may use the method of FIG. 16 that combines the use of an embedded content ID with fingerprinting techniques for determining timing information. Thus, the combined method of FIG. 16 may be used to extend the throughput of embedded data in the audio content. Based on the content ID and the determined timing, the client application may dynamically connect the environmental aspects of the listener using sensors such as accelerometers, GPS, gyroscope with the audio context and may retrieve relevant additional content or metadata for the listener based on the content ID and time information.

In addition, the client application executing on the electronic device of a user may manage the energy efficiency of the electronic device. Audio analysis may rely on spectral information or knowledge about the frequency content to extract features of audio signals. A Fourier Transform may be used to perform a conversion of a time signal to a complex frequency domain. Additionally, a fast Fourier transform (FFT) is the most commonly used algorithm to determine the discrete Fourier transform (DFT) of an audio sequence. The FFT operation may dominate the computational complexity in the algorithm in some examples herein, since the microphone is turned on continuously, and may thereby have a significant impact on battery consumption.

As one example, a commonly used Radix-2 FFT method (e.g., as proposed by Cooley and Tukey) has a complexity increase of "N log N", or "O(N log(N))" where N is number of input points. The following is an example calculation of floating point operations (FLOPS) needed for an 8192 long FFT used in the fingerprinting scheme herein.

Fs=44100

N=8192

Overlap=50%

FFT's per sec=10.76

$5/2*N \log_2 (N)=266240$ floating point operations (flops) per FFT

Approximately=2.7 million floating point operations per second.

Human hearing responds to sound in bands, known as critical bands. These critical bands act as a series of filters in the human ear, and the size of the critical bands may increase with increasing frequency. In sound processing algorithms, the frequency coefficients may be grouped according to critical bands such as based on the Bark scale. The Bark scale ranges from 1 to 24 and corresponds to the 24 critical bands of hearing. Since, for the client application herein, most of the audio energy is located at the central regions and not at the extremes, implementations herein optimize the Bark scale bands to 16 bands. This also gives us an implementation advantage as 16 is a number that is a power of 2 and is therefore more efficient to compute and store. After FFT's are calculated with a high precision, the coefficients may be averaged into Bark Bands to calculate energy. Here, there may be an implicit loss of precision due to aggregation of FFT coefficients that were derived at a high computational cost. However, this process, when performed in the time domain by using the half band filter scheme herein provides much higher efficiency, as described below. At least some of the benefit may be derived from the fact that a half-band split in the time domain has a cost of O(n) as compared to O(N log N) for the fast Fourier transform.

Figure 17:
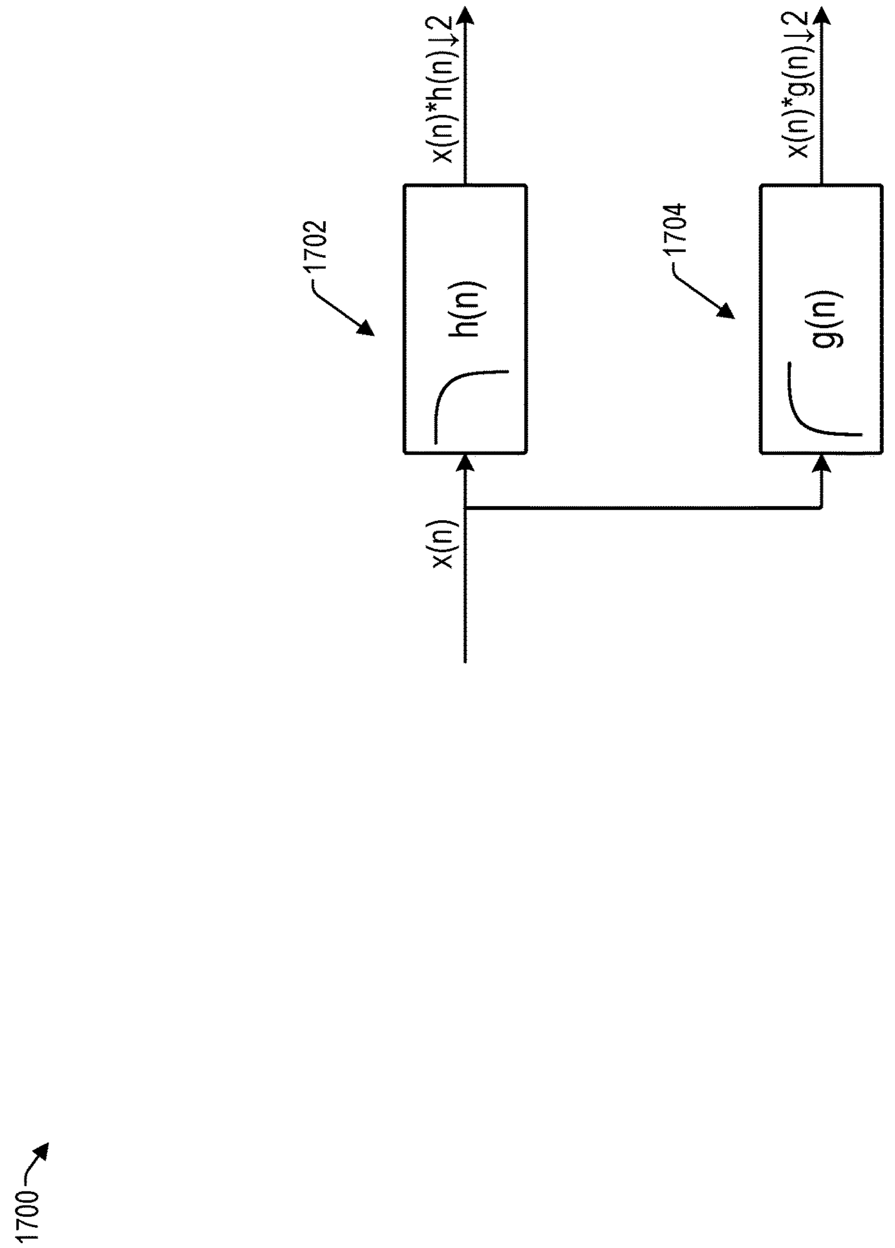
FIG. 17 illustrates an example filter according to some implementations.

FIG. 17 illustrates an example filter 1700 according to some implementations. In this example, the filter 1700 includes a low pass filter 1702 and a high pass filter 1704. In the time domain, the impulse response of a filter may be implemented by convolving the input with the filter response. In the illustrated example, supposed that x(n) is the input signal with a sampling frequency Fs; h(n) is a low-pass filter response removing half of upper available bandwidth (skirt at Fs/4); g(n) is a high-pass filter response removing half of the lower available bandwidth (skirt at Fs/4); and x(n)*h(n) and x(n)*g(n) are the convolution outputs of the respective filters. Furthermore, Fs is reduced by two because only half of the bandwidth of the input spectrum is left.

In this example, if x(n) and h(n) are both a constant length (i.e., their length is independent of N), then x*h and x*g each take O(N) time for processing. This is because the half band filter does each of these two O(N) convolutions and then splits the signal into two branches of size N/2. Since half the frequencies of the signal have now been removed, they can be discarded according to Nyquist's rule. The filter outputs can then be subsampled by two. This leads to the following recurrence relation:

$$T(N)=2N+T(N/2)$$

which gives O(N) time for the entire operation, as can be shown by a geometric series expansion of the above relation.

In the case of non-half band filter, the computational complexity results from a direct convolution, which is O(N×M). By carefully crafting the bands to half bands wherever possible the total complexity reduces slightly higher than to O(N), as O(N×M) occurs towards the extreme ends, however here the number of points are the least (due to the N/2 recursive split).

FIG. 18 illustrates a data structure 1800 showing the locations of half band markers according to some implementations. In this example, the data structure 1800 includes band identifiers 1802 for the 16 Bark bands used in the implementations herein. The data structure 1800 further includes coefficients 1804, frequencies 1806 and locations of half band markers 1808 relative to the Bark bands 1802, the coefficients 1804, and the frequencies 1806. For example, In order for the above-discussed time domain technique to work, the coefficients may be broken into sets in powers of 2 boundaries (64, 128, . . . ). Therefore, the Bark bands may be approximated to the nearest half band markers. Thus, column 1802 shows the Bark bands, and column 1808 shows the approximated bands that fall from the half band filtering process.

Figure 19:
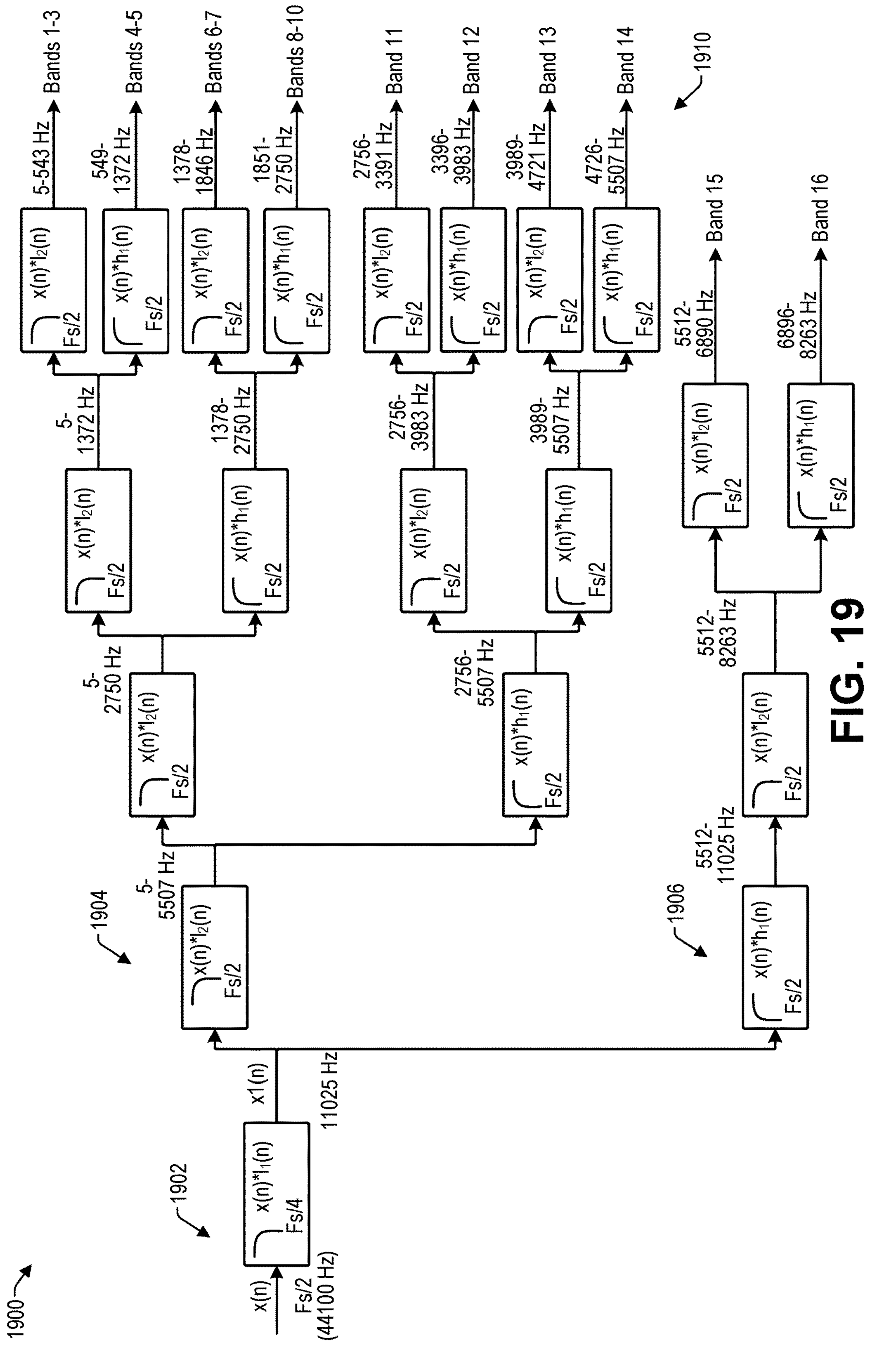
FIG. 19 illustrates a filter arrangement for Bark bands 1-16 according to some implementations.

FIG. 19 illustrates a filter arrangement 1900 for Bark bands 1-16 according to some implementations. In this example, as indicated at 1902, the audio signal x(n) passes through a low pass filter to obtain Fs/4 and an output of x1(n) at one quarter the original frequency. the output x1(n) is provided to a low pass filter, as indicated at 1904, to obtain frequencies between 5 and 5507 Hz, and the output is provided to a high pass filter, as indicated at 1906, to obtain frequencies between 5512 and 11025 Hz. As indicated in FIG. 19, the respective signals output at 1904 and 1906 may be provided to a plurality of additional low pass and high pass filters to continue to separate the signals into frequency ranges to arrive at the 16 Bark bands, as indicated at 1910.

By using this method of time domain Bark band extraction, the FFT calculations may be completely eliminated. Therefore, the computation complexity can be reduced to roughly O(N). The calculations below indicate an estimated decrease in computational complexity from roughly 2 million FLOPS to 110K FLOPS:

Fs=44100

N=8192

Overlap=None

Convolutions per sec=5.38

5/2*N=20480 floating point operations (flops) per FFT

20480*5.38=110K floating point operations per second

Accordingly, implementations herein may perform only 100K operations per second as compared with 2.7 Million operations per second, which may result in more than an order of magnitude improvement (e.g., 24× in this example).

In real-time usage, such as in the case of source providing a live broadcast, live podcast, live stream, or the like (hereinafter "broadcaster"), the embedded data approach discussed above with respect to FIG. 16 (i.e., content ID with fingerprinting) may require the broadcaster to embed an ID in real time, such as discussed above with respect to FIG. 1. Since corresponding fingerprinting information may not be available in real time in a database, the fingerprint information may be omitted in favor of only embedding a content ID, or the like, that includes the context information of the current section of live program, such as pointer to additional content or the like. The embedded ID in this case may directly include a context link that the user can use to steer directly to related additional content, or the like.

On the other hand, if the broadcaster does not embed any ID during broadcast, or the embedded ID is illegible due to poor transmission quality, a fingerprinting decoding algorithm could be activated on the mobile device to recognize the audio content directly and start an automatic context search using a search engine, or the like. In some cases, links may be offered to the listener through the client application for accessing possible additional content associated with the audio content.

In the case of a mobile device that does not have sufficient processing power in general or is too slow for real-time speech or music recognition, the client application may upload the content in real-time to a server (e.g., one of the service computing devices discussed above) with much larger computational processing power that is able to process the data with minimal delay. The server may then also extract fingerprinting information from the uploaded audio content and search the database for any possible connections, such as to identify replays or a song that is being broadcasted live and already exists in the database.

Another scenario for live broadcasting, streaming, podcasting, etc., is that the listener might want set a bookmark in order to rewind to a certain section of the audio content later or to share a particular section of the audio content with another person. By selecting a menu on the electronic device, such as may be provided by the client application, the listener may then command the connected server to store the fingerprint sequence of that particular section to identify the particular second later in a recording. The listener may also use the client application to add context-related information manually. Other real-time listeners or listeners of a recorded broadcast, podcast, etc., may make use of other listeners adding context and bookmarks.

Furthermore, instead of only providing additional content in context to a currently played audio file, the user may search the server database for based on a context to find the ID of a specific audio file that is linked to that context. This way the user may also be referred to the original audio stream and its specific time location.

The data embedding techniques herein may be performed offline (e.g., after the audio content has been recorded) or online (e.g., live in real time as the audio content is being generated). In the offline case, a given piece of audio content may be embedded with one or more IDs, a timestamp, or additional content that the content provider inserts, as discussed above. This audio content, when heard through the client application, may cause the client application to present the additional content (either received through the audio content or downloaded based on information included in the embedded data) and may provide all other features described above.

In the online case, the audio content may be generated live, embedded with embedded data and may be received by the client application through one or more of broadcasting, podcasting, live streaming, and so forth. In some examples, the online case goes through one extra step. For instance, in the case of live broadcast, podcast, streaming, etc., the client application on an electronic device may be used for extracting real-time statistics and for interacting with the listeners dynamically. When the broadcaster is using the client application while broadcasting, the broadcaster may be provided with an option, such as in the form of a button or other virtual control, to disseminate selected additional content to all the listeners connected to the broadcast through the client application at the time. The additional content may be a poll question, an additional piece of information, a URL, an image, or anything else.

After the additional content is disseminated, e.g., via web CMS as discussed above, through traditional Web server, or the like, the additional content may be communicated to the connected listeners through the networks, as discussed above with respect to FIGS. 1 and 2. In turn, the feedback or audience statistics or the like may be delivered back to the broadcaster. In addition, the recorded live broadcast, podcast, etc., may be embedded with a pointed to the additional content, as well as any other additional content that is inserted, so that the additional content is also available to anyone who listens to the recording of the broadcast/podcast at a later time.

The current state of art audio or video streams typically contains unidirectional information pertaining only to audio or video. There is conventionally no possibility to associated additional content, bookmark the audio content, or make the user experience with the audio content interactive. With the technology disclosed herein, however, a listener can receive additional content related to the audio or video content on demand in real time and interact with it.

As one example, when an advertisement audio content is played on an electronic device, the technology herein may enable the user of the electronic device, with a touch of the screen of the device, to purchase the product, get a coupon for the product, place a call to a number provided by the station, cast a vote, buy a concert ticket, or simply request information about the content being played. Alternatively, the listener can use the client application at a later point in time to look up more information about the content, access the content again, or the like.

As discussed above, implementations herein are able to embeds data into audio content without affecting the fidelity of the audio content, which enables the audio content to be both bidirectional and responsive. The data embedding technology provides new monetization avenues, analytics, embeddable ads, lead generation, social sharing, and access to the benefits of "big data" for audio content, broadcasters, podcaster, Internet streaming sources, and the like. Further, users are able to interact with their audio content regardless of its source. In addition to the embedded data discussed above, in some examples, one or more control signals may provide the user with the ability to play, pause, rewind, record, and fast-forward any audio source from the audio file itself.

In some examples herein, the service computing device(s) may automatically generate "listen logs" of the content a user listens to, and that may be saved for later. The client application may include recall features to enable a user to look up audio content received in the past. In addition, users may benefit from learning based audio behavior prediction via automated analysis of their usage, such as by receiving recommendations for upcoming broadcasts, podcasts, or the like.

The solution herein enables content owners, broadcasters/podcasters, and advertisers to monetize audio content. With the touch of a button listeners can buy products, get coupons, cast votes, express interest, request information, bookmark and share content. The examples herein include encoding data such as tags into audio content enabling the audio content to have structured content similar to markup languages such as HTML. The client application may decode the embedded data to extract the additional content or a pointer to the additional content while the user is listening to the audio content, thereby enabling the content source to deliver an enriched user experience. Further, the technology herein enables audio streams to be both bidirectional and responsive.

In some examples, the augmented audio (or video) technology herein may encrypt data by creating unique escape or markup codes in the audio file that can be displayed in browser with a built-in decoder while playing the audio content. Furthermore, the encoder may encode markup code elements consisting of additional content, and the elements may be entered synchronously with the audio content. The audio (or video) may be encoded at the design time as well as at the run time. The markup elements may be entered in pairs or non-pairs. For example, first additional content in a pair may be the start tag and a second additional content may be the end tag. In between the start tag and the end tag, the content provider or designer can enter hyperlinks, text based content, comments, or the like. The embedded data may include information to enable the client application to access or otherwise obtain the relevant audio (or video) sections. Implementations herein may also embed scripts written in languages such as JavaScript which may be executed to affect the behavior of audio (or video), such as based on interaction by the user.

The audio decoder herein may be included in the client application and may read the encoded audio, may extract the embedded data from the audio signal, and may present the embedded data or additional content obtained based on the embedded data at the correct time sequence of the audio (or video) content.

In some examples herein, the additional content may be embedded as the embedded data directly in the audio content itself without significantly compromising the sound quality of the audio content. The techniques discussed above may be used to extract embedded data, such as text from the audio. With this technology, the audio content is sensed by a microphone of an electronic device and processed to extract the embedded data, which may be presented to the user for interaction. Additionally, some examples may include a speech-to-text converter to identify predetermined keywords and tag the audio content in real-time. For example, the system may automatically select additional content to associate with the audio content based on a context determined from the speech-to text conversion.

Additionally, in some cases, a user may augment the audio using an electronic device such as smart phone. For instance, data such as links, comments, or other information may be inserted into the audio content and shared through social media, or through various types of electronic communication, such as SMS or email. This creates a new audio stream with data embedded on top of it without compromising the signal quality of the audio.

The techniques described herein may empower content owners and providers by allowing them to take full control of product placement in their audio content itself and make market benefits available such through lead generation or e-commerce. Further, the techniques herein may enable listeners to respond immediately via compelling calls to action. For example, listeners may be able to immediately redeem offers such as through a coupon, secret phrase, link to a website, a telephone number or the like, all in real time. Listeners can then share with friends making each effort a viral campaign. In addition, on-air advertising may be extended to additional people that did not even listen to the broadcast.

Additional advantages of the technology herein may include surveying an audience on a variety of topics, performing fundraising, such as by enabling listeners to make donations instantly. In addition, advertisers may serve contextual advertisements based on a user's past or present audio content selection. Furthermore, passive listeners can access the data augmented (inserted) in the audio by way of notification messages in the phone lock screen. In addition, the client application may be configured to provide audio bookmarking, a save for later feature, and/or sending emails to enables passive listeners to receive the additional content corresponding to the data embedded in the audio content.

In some cases, the additional content may be delivered to the user through a smart watch or other wearable electronic devices, and may enable a one-tap response to a call to action. Furthermore, display consoles in vehicles may be used to deliver interactive audio during driving with voice and/or tap interaction. The additional content may be selected based on location that may be acquired using GPS or other methods. Furthermore, user interaction analytics methods discussed above may be used for various extracted data based on listener location, social profile, demographics, user interaction, and user behavior.

Figure 20:
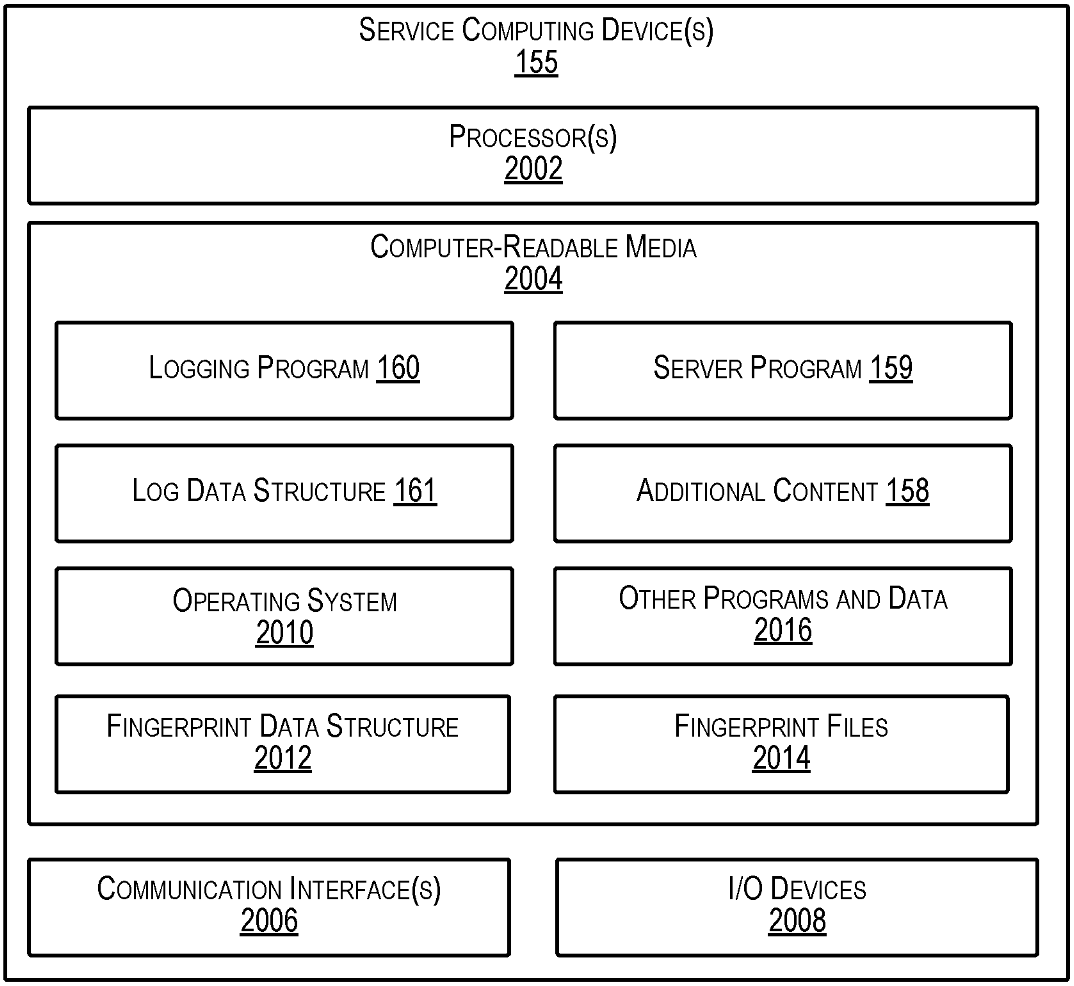
FIG. 20 illustrates select components of a service computing device that may be used to implement some functionality of the services described herein.

FIG. 20 illustrates select components of the service computing device(s) 155 that may be used to implement some functionality of the services described herein. The service computing device 155 may include one or more servers or other types of computing devices that may be embodied in any number of ways. For instance, in the case of a server, the programs, other functional components, and data may be implemented on a single server, a cluster of servers, a server farm or data center, a cloud-hosted computing service, and so forth, although other computer architectures may additionally or alternatively be used.

Further, while the figures illustrate the components and data of the service computing device 155 as being present in a single location, these components and data may alternatively be distributed across different computing devices and different locations in any manner. Consequently, the functions may be implemented by one or more service computing devices, with the various functionality described above distributed in various ways across the different computing devices. Multiple service computing devices 155 may be located together or separately, and organized, for example, as virtual servers, server banks, and/or server farms. The described functionality may be provided by the servers of a single entity or enterprise, or may be provided by the servers and/or services of multiple different entities or enterprises.

In the illustrated example, each service computing device 155 may include one or more processors 2002, one or more computer-readable media 2004, and one or more communication interfaces 2006. Each processor 2002 may be a single processing unit or a number of processing units, and may include single or multiple computing units, or multiple processing cores. The processor(s) 2002 can be implemented as one or more microprocessors, microcomputers, microcontrollers, digital signal processors, central processing units, state machines, logic circuitries, and/or any devices that manipulate signals based on operational instructions. For instance, the processor(s) 2002 may be one or more hardware processors and/or logic circuits of any suitable type specifically programmed or configured to execute the algorithms and processes described herein. The processor(s) 2002 can be configured to fetch and execute computer-readable instructions stored in the computer-readable media 2004, which can program the processor(s) 2002 to perform the functions described herein.

The computer-readable media 2004 may include volatile and nonvolatile memory and/or removable and non-removable media implemented in any type of technology for storage of information, such as computer-readable instructions, data structures, program modules, or other data. Such computer-readable media 2004 may include, but is not limited to, RAM, ROM, EEPROM, flash memory or other memory technology, optical storage, solid state storage, magnetic tape, magnetic disk storage, storage arrays, network attached storage, storage area networks, cloud storage, RAID storage systems, or any other medium that can be used to store the desired information and that can be accessed by a computing device. Depending on the configuration of the service computing device 155, the computer-readable media 2004 may be a tangible non-transitory media to the extent that, when mentioned, non-transitory computer-readable media exclude media such as energy, carrier signals, electromagnetic waves, and signals per se.

The computer-readable media 2004 may be used to store any number of functional components that are executable by the processor(s) 2002. In many implementations, these functional components comprise instructions or programs that are executable by the processor(s) 2002 and that, when executed, specifically configure the one or more processors 2002 to perform the actions attributed above to the service computing device 155. Functional components stored in the computer-readable media 2004 may include the server program 159 and the logging program 160. Additional functional components stored in the computer-readable media 2004 may include an operating system 2010 for controlling and managing various functions of the service computing device 155.

In addition, the computer-readable media 2004 may store data and data structures used for performing the operations described herein. Thus, the computer-readable media 2004 may store the additional content 158 that is served to the electronic devices of audience members, as well as the log data structure 161. In addition, in some examples, the computer-readable media 2004 associated with one or more of the service computing devices 155 may store a fingerprint data structure 2012 for storing a large number of audio content fingerprint files 2014 in relation to content IDs, e.g., as discussed above with respect to FIG. 16. For example, the fingerprint data structure 2012 may be a relational database, a table, or other suitable data structure that enables the service computing device 155 to receive a content ID, such as a universal ID, source ID, or the like, from an electronic device that decoded the content ID from embedded data in audio content. The service computing device 155 may use the content ID to access the fingerprint data structure 2012 to identify a storage location of a stored fingerprint file 2014 based on the received content ID. For example, the server program 159 may quickly retrieve the correct fingerprint file 2014 based on the received content ID, without having to compare and match a received fingerprint with a large database of fingerprint files, and may send the retrieved fingerprint file 2014 to the electronic device that sent the content ID (not shown in FIG. 20).

The service computing device 155 may also include or maintain other functional components and data not specifically shown in FIG. 20, such as other programs and data 2016, which may include programs, drivers, etc., and the data used or generated by the functional components. Further, the service computing device 155 may include many other logical, programmatic, and physical components, of which those described above are merely examples that are related to the discussion herein.

The communication interface(s) 2006 may include one or more interfaces and hardware components for enabling communication with various other devices, such as over the network(s) 106. For example, communication interface(s) 2006 may enable communication through one or more of the Internet, cable networks, cellular networks, wireless networks (e.g., Wi-Fi) and wired networks (e.g., fiber optic and Ethernet), as well as short-range communications, such as BLUETOOTH®, BLUETOOTH® low energy, and the like, as additionally enumerated elsewhere herein.

The service computing device 155 may further be equipped with various input/output (I/O) devices 2008. Such I/O devices 2008 may include a display, various user interface controls (e.g., buttons, joystick, keyboard, mouse, touch screen, etc.), audio speakers, connection ports and so forth.

In addition, the other computing devices described above, such as the data computing device 120, the remote data computing device 130, and the streaming computing device(s) 144 may have similar hardware configurations to that discussed above, but with different functional components executable for performing the functions described for each of these devices.

Figure 21:
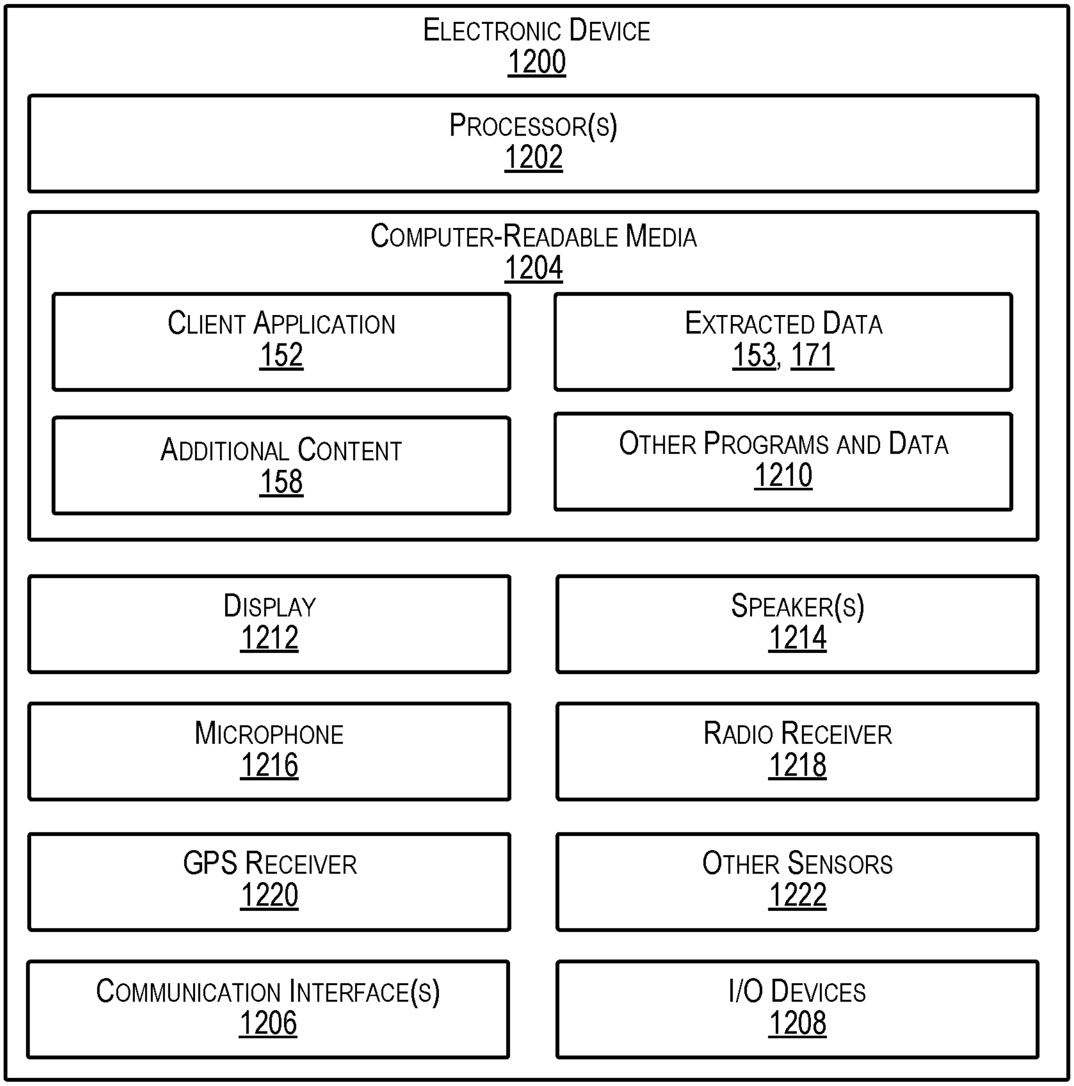
FIG. 21 illustrates select example components of an electronic device that may correspond to the electronic devices discussed herein, and that may implement the functionality described above according to some examples.

FIG. 21 illustrates select example components of an electronic device 2100 that may correspond to the electronic devices discussed above, such as electronic devices 150, 162, 168, 180, 1400, and 1604 that may implement the functionality described above according to some examples. The electronic device 2100 may be any of a number of different types of computing devices, such as mobile, semi-mobile, semi-stationary, or stationary. Some examples of the electronic device 2100 may include tablet computing devices, smart phones, wearable computing devices or body-mounted computing devices, and other types of mobile devices; laptops, netbooks and other portable computers or semi-portable computers; desktop computing devices, terminal computing devices and other semi-stationary or stationary computing devices; augmented reality devices and home audio systems; vehicle audio systems, voice activated home assistant devices, or any of various other computing devices capable of storing data, sending communications, and performing the functions according to the techniques described herein.

In the example of FIG. 21, the electronic device 2100 includes a plurality of components, such as at least one processor 2102, one or more computer-readable media 2104, one or more communication interfaces 2106, and one or more input/output (I/O) devices 2108. Each processor 2102 may itself comprise one or more processors or processing cores. For example, the processor 2102 can be implemented as one or more microprocessors, microcomputers, microcontrollers, digital signal processors, central processing units, state machines, logic circuitries, and/or any devices that manipulate signals based on operational instructions. In some cases, the processor 2102 may be one or more hardware processors and/or logic circuits of any suitable type specifically programmed or otherwise configured to execute the algorithms and processes described herein. The processor 2102 can be configured to fetch and execute computer-readable processor-executable instructions stored in the computer-readable media 2104.

Depending on the configuration of the electronic device 2100, the computer-readable media 2104 may be an example of tangible non-transitory computer storage media and may include volatile and nonvolatile memory and/or removable and non-removable media implemented in any type of technology for storage of information such as computer-readable instructions, data structures, program modules, or other data. The computer-readable media 2104 may include, but is not limited to, RAM, ROM, EEPROM, flash memory, solid-state storage, magnetic disk storage, optical storage, and/or other computer-readable media technology. Further, in some cases, the electronic device 2100 may access external storage, such as storage arrays, network attached storage, storage area networks, cloud storage, RAID storage systems, or any other medium that can be used to store information and that can be accessed by the processor 2102 directly or through another computing device or network. Accordingly, the computer-readable media 2104 may be computer storage media able to store instructions, modules, or components that may be executed by the processor 2102. Further, when mentioned, non-transitory computer-readable media exclude media such as energy, carrier signals, electromagnetic waves, and signals per se.

The computer-readable media 2104 may be used to store and maintain any number of functional components that are executable by the processor 2102. In some implementations, these functional components comprise instructions or programs that are executable by the processor 2102 and that, when executed, implement algorithms or other operational logic for performing the actions attributed above to the electronic devices herein. Functional components of the electronic device 2100 stored in the computer-readable media 2104 may include the client application 152, as discussed above, that may be executed for extracting embedded data from received audio content.

The computer-readable media 2104 may also store data, data structures and the like, that are used by the functional components. Depending on the type of the electronic device 2100, the computer-readable media 2104 may also store other functional components and data, such as other programs and data 2110, which may include an operating system for controlling and managing various functions of the electronic device 2100 and for enabling basic user interactions with the electronic device 2100, as well as various other applications, modules, drivers, etc., and other data used or generated by these components. Further, the electronic device 2100 may include many other logical, programmatic, and physical components, of which those described are merely examples that are related to the discussion herein.

The communication interface(s) 2106 may include one or more interfaces and hardware components for enabling communication with various other devices, such as over the network(s) 106 or directly. For example, communication interface(s) 2106 may enable communication through one or more of the Internet, cable networks, cellular networks, wireless networks (e.g., Wi-Fi) and wired networks, as well as close-range communications such as BLUETOOTH®, and the like, as additionally enumerated elsewhere herein.

FIG. 21 further illustrates that the electronic device 2100 may include a display 2112. Depending on the type of computing device used as the electronic device 2100, the display 136 may employ any suitable display technology. Alternatively, in some examples, the electronic device 2100 might not include a display.

The electronic device 2100 may further include one or more speakers 2114, a microphone 2116, a radio receiver 2118, a GPS receiver 2120, and one or more other sensors 2122, such as an accelerometer, gyroscope, compass, proximity sensor, and the like. The electronic device 2100 may further include the one or more I/O devices 2108. The I/O devices 2108 may include a camera and various user controls (e.g., buttons, a joystick, a keyboard, a keypad, touchscreen, etc.), a haptic output device, and so forth. Additionally, the electronic device 2100 may include various other components that are not shown, examples of which may include removable storage, a power source, such as a battery and power control unit, and so forth.

Various instructions, methods, and techniques described herein may be considered in the general context of computer-executable instructions, such as computer programs and applications stored on computer-readable media, and executed by the processor(s) herein. Generally, the terms program and application may be used interchangeably, and may include instructions, routines, modules, objects, components, data structures, executable code, etc., for performing particular tasks or implementing particular data types. These programs, applications, and the like, may be executed as native code or may be downloaded and executed, such as in a virtual machine or other just-in-time compilation execution environment. Typically, the functionality of the programs and applications may be combined or distributed as desired in various implementations. An implementation of these programs, applications, and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A system comprising:

an audio encoder for embedding data into audio content; and a first computing device in communication with the audio encoder, the first computing device including a processor configured by executable instructions to perform operations comprising:

receiving audio content for distribution to a plurality of electronic devices;

presenting a user interface to enable a user to select data to be related to the audio content for distribution to the plurality of electronic devices, the user interface presenting a plurality of different data categories selectable in the user interface for selecting first data to at least one of associate with the audio content or embed in the audio content;

decoding a portion of the received audio content to detect a start of frame indicator to determine that the audio content already has second data embedded in the audio content;

based on detecting at least the start of frame indicator, extracting a psychoacoustic mask from the received audio content;

subtracting the psychoacoustic mask from the received audio content to remove the embedded second data;

receiving, via the user interface, a user selection providing an indication of the first data to at least one of associate with the audio content or embed in the audio content;

based at least in part on determining that the first data exceeds a threshold size, sending, by the first computing device, the first data to a second computing device to be provided for download to the electronic devices; and based at least in part on determining that the first data exceeds the threshold size, sending, to the audio encoder, third data to embed in the audio content as embedded third data, the third data including information for identifying the first data following extraction of the embedded third data by individual electronic devices of the plurality of electronic devices.

2. The system as recited in claim 1, wherein the third data includes a content identifier (ID), the operations further comprising:

generating, by the first computing device, a fingerprint from the audio content;

storing, by the first computing device, the fingerprint in association with the content ID; and sending, by the first computing device, the first data, the content ID, and the fingerprint to the second computing device to provide the first data for storage in a content management system (CMS) repository associated with the second computing device, wherein the plurality of electronic devices are able to access the first data in the CMS repository based at least in part on the embedded third data embedded in the audio content.

3. The system as recited in claim 1, the operations further comprising receiving, from the second computing device, information about a plurality of users of the plurality of electronic devices, respectively, based on the second computing device receiving communications from the plurality of electronic devices based at least in part on the third data.

4. The system as recited in claim 3, wherein the received information about the plurality of users includes at least one of location information, demographic information, listening duration information, or an action performed in response to at least one of the first data or the third data.

5. The system as recited in claim 1, the operations further comprising sending the audio content with the embedded third data as at least one of: streaming content sent over a network, or broadcasted content sent as a radio wave.

6. The system as recited in claim 1, the operations further comprising storing the audio content for subsequent access by one or more of the electronic devices, wherein the one or more electronic devices are subsequently able to access the first data at the second computing device based on accessing the stored audio content with the embedded third data, extracting the embedded third data from the audio content, using the third data to obtain a fingerprint of the audio content, and accessing the first data based on timing information determined at least in part from the fingerprint.

7. The system as recited in claim 1, the operations further comprising:

prior to extracting the psychoacoustic mask from the received audio content, decoding the received audio content to extract at least a source identifier (ID) from the second data embedded in the received audio content;

comparing the source ID extracted from the second data embedded in the received audio content with a current source ID; and based at least in part on the extracted source ID being different from the current source ID, performing the subtracting the psychoacoustic mask from the received audio content.

8. A method comprising:

receiving, by one or more processors, audio content for distribution to a plurality of electronic devices;

presenting a user interface to enable a user to select first data to be related to the audio content for distribution to the plurality of electronic devices;

decoding a portion of the received audio content to detect a start of frame indicator to determine that the audio content already has second data embedded in the audio content;

based on detecting at least the start of frame indicator, extracting a psychoacoustic mask from the received audio content;

subtracting the psychoacoustic mask from the received audio content to remove the embedded second data;

receiving, via the user interface, a user selection providing an indication of the first data to at least one of associate with the audio content or embed in the audio content;

sending, by the first computing device, the first data to a second computing device to provide for download to the electronic devices; and sending, to an audio encoder, third data to embed in the audio content as embedded third data, the third data including information for identifying the first data following extraction of the embedded third data by individual electronic devices of the plurality of electronic devices.

9. The method as recited in claim 8, wherein the third data includes a content identifier (ID), the method further comprising:

generating, by the first computing device, a fingerprint from the audio content;

storing, by the first computing device, the fingerprint in association with the content ID; and sending, by the first computing device, the first data, the content ID, and the fingerprint to the second computing device to provide the first data for storage in a content management system (CMS) repository associated with the second computing device, wherein the plurality of electronic devices are able to access the first data in the CMS repository based at least in part on the embedded third data embedded in the audio content.

10. The method as recited in claim 8, wherein the user interface presents a plurality of virtual controls selectable for selecting one or more of a plurality of different data categories, respectively, for selecting the first data to at least one of associate with the audio content or embed in the audio content.

11. The method as recited in claim 8, further comprising:

comparing a size of the first data with a threshold size for embedding data into the audio content; and based at least in part on determining that the first data exceeds the threshold size, determining to not embed the first data into the audio content, sending the first data to the second computing device to be provided for download, and sending, to the audio encoder, the third data including information for identifying the first data.

12. The method as recited in claim 8, further comprising sending the audio content with the embedded third data as at least one of: streaming content sent over a network, or broadcasted content sent as a radio wave.

13. The method as recited in claim 8, further comprising storing the audio content for subsequent access by one or more of the electronic devices, wherein the one or more electronic devices are subsequently able to access the first data at the second computing device based on accessing the stored audio content with the embedded third data, extracting the embedded third data from the audio content, using the third data to obtain a fingerprint of the audio content, and accessing the first data based on timing information determined at least in part from the fingerprint.

14. The method as recited in claim 8, further comprising:
- prior to extracting the psychoacoustic mask from the received audio content, decoding the received audio content to extract at least a source identifier (ID) from the second data embedded in the received audio content;
- comparing the source ID extracted from the second data embedded in the received audio content with a current source ID; and
- based at least in part on the extracted source ID being different from the current source ID, performing the subtracting the psychoacoustic mask from the received audio content.

15. A computing device comprising:
- one or more processors configured by executable instructions to perform operations comprising:
  - receiving audio content for distribution to a plurality of electronic devices;
  - presenting a user interface to enable a user to select first data to be related to the audio content for distribution to the plurality of electronic devices;
  - decoding a portion of the received audio content to detect a start of frame indicator to determine that the audio content already has second data embedded in the audio content;
  - based on detecting at least the start of frame indicator, extracting a psychoacoustic mask from the received audio content;
  - subtracting the psychoacoustic mask from the received audio content to remove the embedded second data;
  - receiving, via the user interface, a user selection providing an indication of the first data to at least one of associate with the audio content or embed in the audio content;
  - based at least in part on determining that the first data exceeds a threshold size, sending, by the first computing device, the first data to a second computing device to be provided for download to the electronic devices; and
  - based at least in part on determining that the first data exceeds the threshold size, sending, to an audio encoder, third data to embed in the audio content as embedded third data, the third data including information for identifying the first data following extraction of the embedded third data by individual electronic devices of the plurality of electronic devices.

16. The computing device as recited in claim 15, wherein the third data includes a content identifier (ID), the operations further comprising:
- generating, by the first computing device, a fingerprint from the audio content;
- storing, by the first computing device, the fingerprint in association with the content ID; and
- sending, by the first computing device, the first data, the content ID, and the fingerprint to the second computing device to provide the first data for storage in a content management system (CMS) repository associated with the second computing device,
- wherein the plurality of electronic devices are able to access the first data in the CMS repository based at least in part on the embedded third data embedded in the audio content.

17. The computing device as recited in claim 15, wherein the user interface presents a plurality of virtual controls selectable for selecting one or more of a plurality of different data categories, respectively, for selecting the first data to at least one of associate with the audio content or embed in the audio content.

18. The computing device as recited in claim 15, the operations further comprising sending the audio content with the embedded third data as at least one of: streaming content sent over a network, or broadcasted content sent as a radio wave.

19. The computing device as recited in claim 15, the operations further comprising storing the audio content for subsequent access by one or more of the electronic devices, wherein the one or more electronic devices are subsequently able to access the first data at the second computing device based on accessing the stored audio content with the embedded third data, extracting the embedded third data from the audio content, using the third data to obtain a fingerprint of the audio content, and accessing the first data based on timing information determined at least in part from the fingerprint.

20. The computing device as recited in claim 15, the operations further comprising:
- prior to extracting the psychoacoustic mask from the received audio content, decoding the received audio content to extract at least a source identifier (ID) from the second data embedded in the received audio content;
- comparing the source ID extracted from the second data embedded in the received audio content with a current source ID; and
- based at least in part on the extracted source ID being different from the current source ID, performing the subtracting the psychoacoustic mask from the received audio content.

* * * * *